(12) United States Patent
Yamakawa

(10) Patent No.: US 8,294,905 B2
(45) Date of Patent: Oct. 23, 2012

(54) OPTICAL MEASUREMENT DEVICE

(75) Inventor: Kenta Yamakawa, Fukuchiyama (JP)

(73) Assignee: Omron Corporation, Kyoto (JP)

( * ) Notice: Subject to any disclaimer, the term of this patent is extended or adjusted under 35 U.S.C. 154(b) by 427 days.

(21) Appl. No.: 12/617,541

(22) Filed: Nov. 12, 2009

(65) Prior Publication Data

US 2010/0123904 A1    May 20, 2010

(30) Foreign Application Priority Data

Nov. 14, 2008    (JP) ............................... P2008-292311

(51) Int. Cl.
*G01B 11/14* (2006.01)

(52) U.S. Cl. ..................................... 356/614

(58) Field of Classification Search .................. None
See application file for complete search history.

(56) References Cited

U.S. PATENT DOCUMENTS

| | | | |
|---|---|---|---|
| 5,774,224 A | 6/1998 | Kerstens | |
| 2002/0014577 A1 | 2/2002 | Ulrich et al. | |
| 2004/0004723 A1 | 1/2004 | Seko et al. | |
| 2004/0061872 A1 | 4/2004 | Nakano | |
| 2006/0188133 A1 | 8/2006 | Schallig et al. | |

FOREIGN PATENT DOCUMENTS

| | | |
|---|---|---|
| DE | 4342212 C1 | 5/1995 |
| DE | 19721688 A1 | 9/1998 |
| JP | 2002-357408 | 12/2002 |

OTHER PUBLICATIONS

German Patent Office examination report on application No. 10 2009 046 262.7 dated Sep. 22, 2010; pp. 1-4.
German Patent and Trademark Office action on application No. 10 2009 046 262.7 dated Jul. 6, 2011; 4 pages.

*Primary Examiner* — Layla Lauchman
*Assistant Examiner* — Amanda Merlino
(74) *Attorney, Agent, or Firm* — Foley & Lardner LLP

(57) ABSTRACT

This invention provides an optical measurement device enabling a highly accurate measurement with respect to a measuring target object in which an inclined surface or a curved surface exists at one part of the surface or a tilted measuring target object. The light shielding portion is configured to define an incident angle range with respect to a light receiving center axis of a diffuse reflected light. In other words, a maximum angle formed by the advancing direction of the diffuse reflected light and the light receiving center axis when the diffuse reflected light passes through the opening of the light shielding portion is defined by the diameter of the opening. The light projecting portion projects a light projection beam so that a converging position on the light receiving center axis is included within a range of the light shielding portion on the light receiving center axis for the component converged by the lens portion of the light projection beam (i.e., reflected light beam) specular reflected at the surface of the measuring target object.

8 Claims, 15 Drawing Sheets

FIG. 4
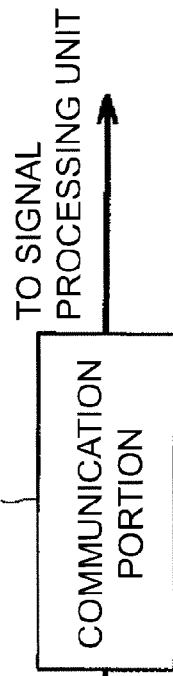
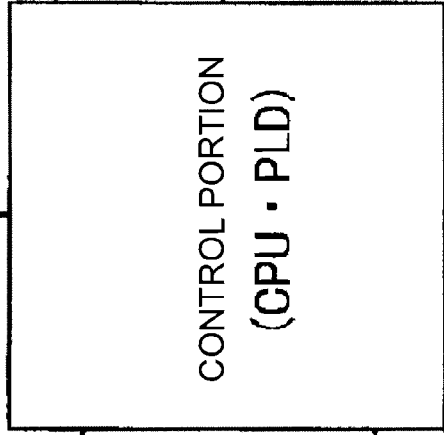
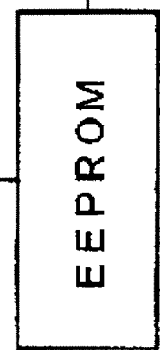

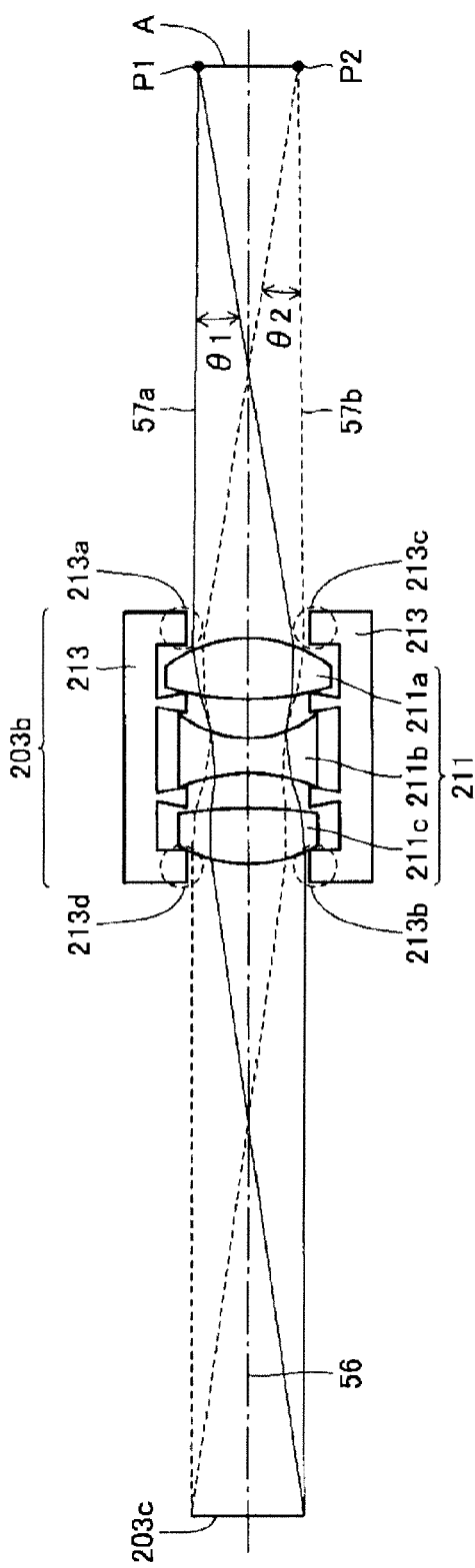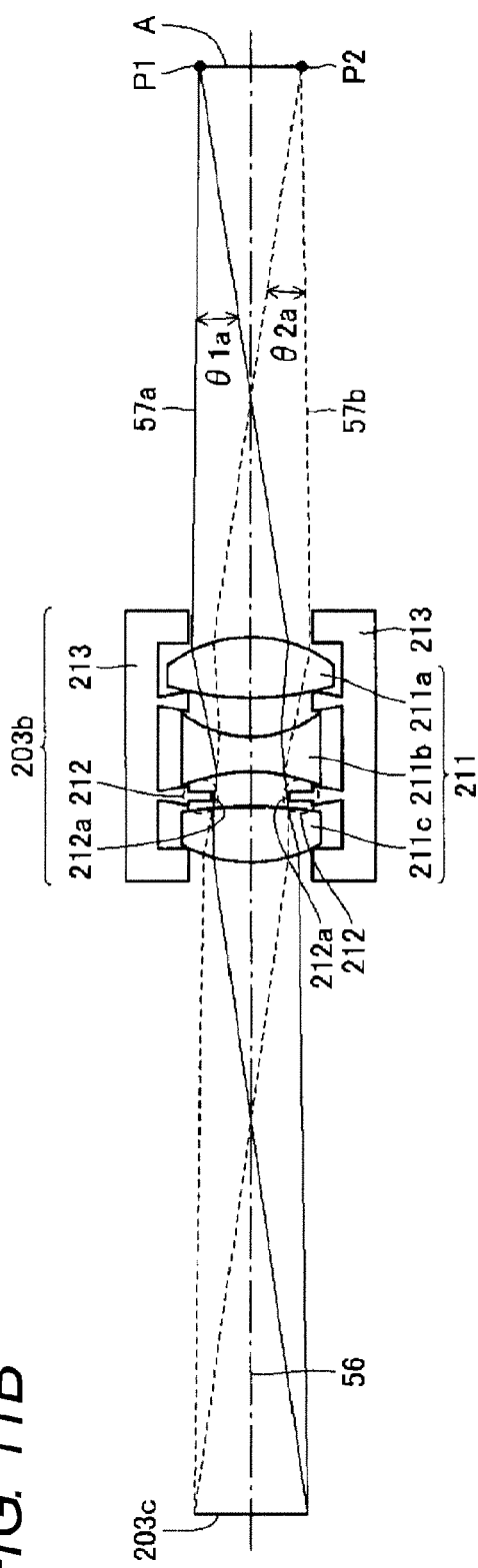
FIG. 11A
FIG. 11B

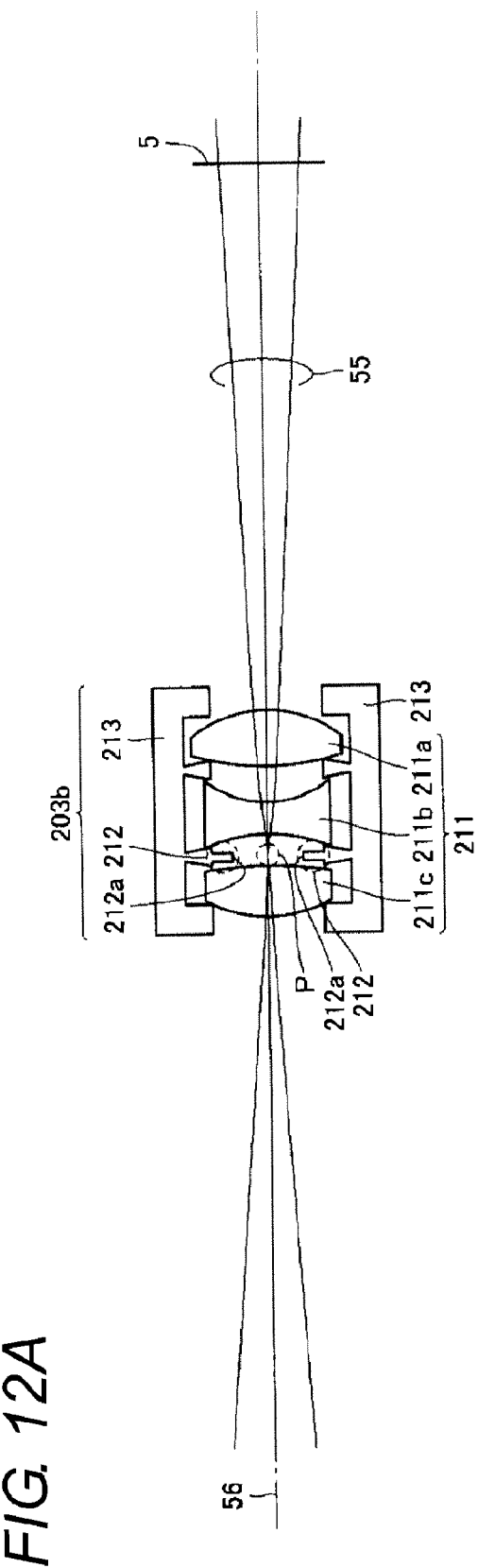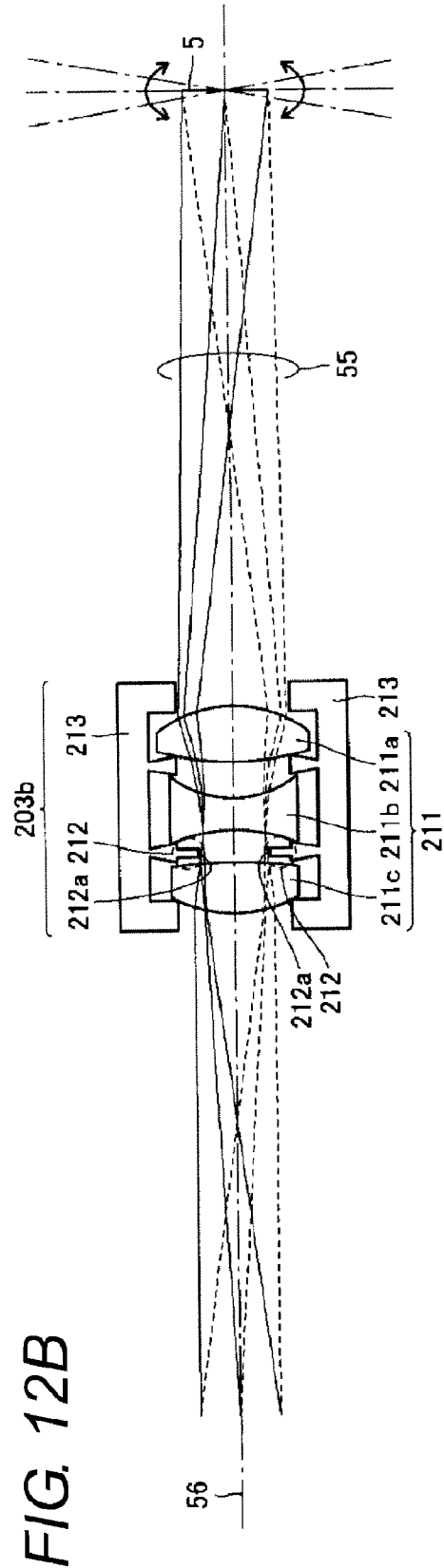
FIG. 12A
FIG. 12B

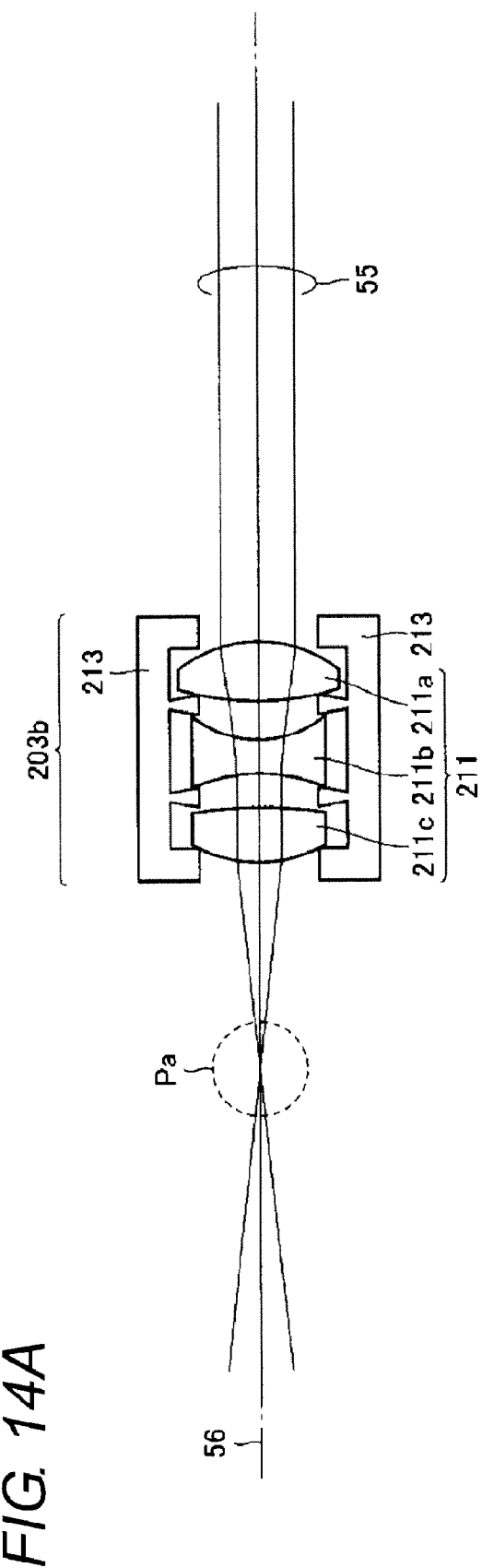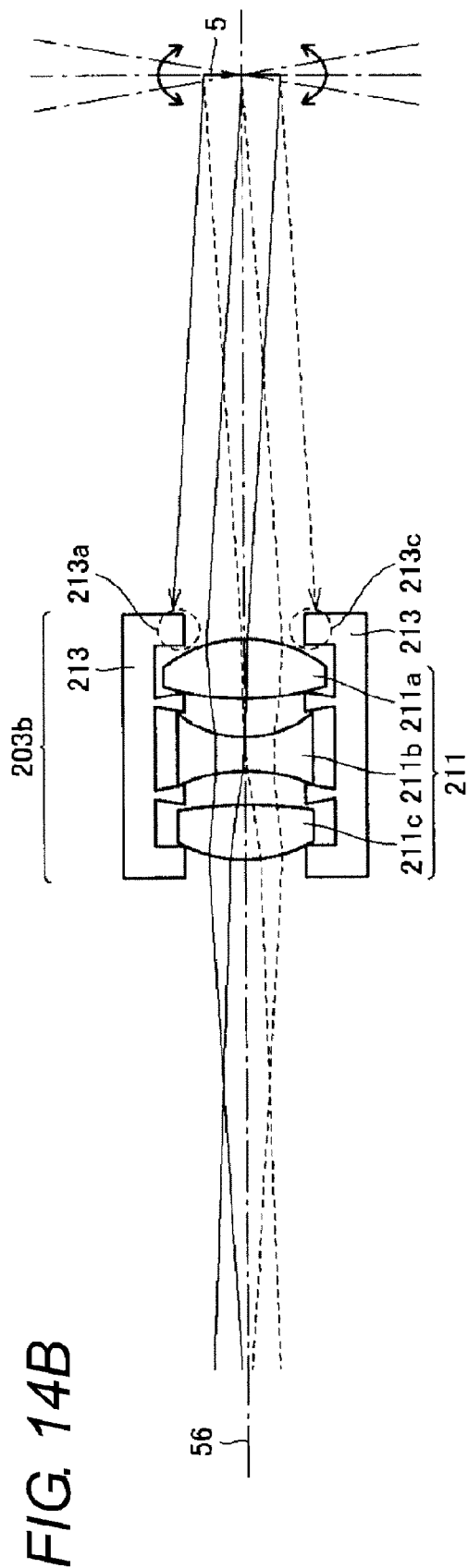

OPTICAL MEASUREMENT DEVICE

This application is based on Japanese Patent Application No. 2008-292311 filed with the Japan Patent Office on Nov. 14, 2008, the entire content of which is hereby incorporated by reference.

BACKGROUND OF THE INVENTION

1. Technical Field

The present invention relates to optical measurement devices, in particular, to an optical system arranged in an optical measurement device.

2. Related Art

A sensor device for measuring displacement, length, angle, and the like of various measuring target objects is conventionally known. For instance, the optical measurement device (also referred to as "displacement sensor") that uses a light cutting method is known, the optical measurement device including a light projection unit for shaping a light from a light source to a line beam, and irradiating a surface of a measuring target object with the light at a predetermined angle, a photographing unit for photographing a line beam irradiating position at the surface of the measuring target object using a two-dimensional imaging element from a direction different from the irradiating direction of the line beam and acquiring an image including a sectional contour image of a light cutting surface, and a measurement unit for generating a measurement value and/or determination value by executing a predetermined measurement process based on the sectional contour image of the light cutting surface obtained by the photographing unit.

The above-described optical measurement device measures the displacement by applying the principle of triangulation, which optical measurement device can be broadly divided into two types according to the type of reflected light from a measuring target region received by the imaging unit. One type is a method of directly receiving a specular reflected light from an object, and the other type is a method of projecting a projection beam perpendicularly to the measurement surface and receiving a diffuse reflected light in the reflected light.

The direction of a line formed by the cross-section of the line beam corresponds to a vertical scanning direction (or horizontal scanning direction) in the view of the two-dimensional photographing element. The direction the sectional contour image-formed by the line beam moves in the view of the two-dimensional imaging element when the distance between the measurement device (generally sensor head) and the measuring target object changes corresponds to the horizontal scanning direction (or vertical scanning direction). The sectional contour image of the light cutting surface is thereby formed at the light receiving surface of the two-dimensional imaging element.

According to such optical measurement device, since the line beam having a linear cross-section is used for a cutting light, the information of a series of measurement points along a constant line at the surface of the measuring target object can be collectively acquired without relatively moving the cutting light and the measuring target object, as a device using a spot light having a dotted cross-section for the cutting light. Thus, if applied to tests etc. of industrial products flowing through the production line, the dimension of each portion of the surface of the measuring target object can be accurately measured based on the information of the series of measurement points, and defect determination of the product and the like can be rapidly and reliably carried out.

In tests etc. of industrial product of this type, the measuring target object having various shapes needs to be considered. For instance, in some industrial products, the reflected light quantity the sensor can retrieve partially differs since one part of the surface is an inclined surface or a curved surface. When testing such industrial products (measurement of surface displacement etc.), the image becomes dark due to lack of reflected light quantity or normal measurement may not be performed as light cannot be retrieved.

Japanese Patent Publication No. 3575693 (patent document 1) discloses an optical measurement device which synthesizes a plurality of images having different photographing conditions and performs measurement based on the synthesized image to solve the above problems.

SUMMARY

According to the technique described in Japanese Patent Publication No. 3575693 (patent document 1), the measurement of the displacement is considered possible for the measuring target object in which one part of the surface is known to be an inclined surface or a curved surface in advance. However, in rare occasions, the numerous industrial products flowing through the production line sometimes include products moving in a tilted state as a result of a foreign substance being caught in between the stage. Whether or not the surface displacement of the object can be measured even if the measuring target object is tilted due to unpredictable reasons is not particularly described in Japanese Patent Publication No. 3575693.

Assuming such event in advance, consideration is made in uniformly imaging a plurality of images with respect to all measuring target objects and synthesizing the images to measure the displacement of each measuring target object. In this case, however, the productivity at the production line is assumed to lower.

The present invention has been devised to solve the problems described above, and an object thereof is to provide an optical measurement device enabling highly accurate measurement with respect to a measuring target object in which an inclined surface or a curved surface exists at one part of the surface or to a tilted measuring target object.

In summary, the present invention relates to an optical measurement device including a light projecting portion, a light receiving portion, and a measurement processing portion. The light projecting portion projects an irradiation light towards a measuring target object existing in a measurement region. The light receiving portion receives a reflected light of both a diffuse reflected light and a specular reflected light generated when the irradiation light is reflected at a surface of the measuring target object from a direction in which a position of a reflected light image obtained according to a displacement of the surface of the measuring target object changes, and acquires an image of the reflected light image. The measurement processing portion measures the displacement of the surface of the measuring target object that reflects the irradiation light based on the image acquired by the light receiving portion. The light receiving portion includes an imaging portion, an image-forming portion, and a light shielding portion. The imaging portion acquires an image of the incident light as the image. The image-forming portion causes the imaging portion to image-form the reflected light generated when the irradiation light projected from the light projecting portion is reflected at the surface of the measuring target object. The light shielding portion defines, when the irradiation light is diffuse reflected at the measuring target object existing in the measurement region, an incident angle range with respect to a center optical axis of the image-forming portion of the diffuse reflected light reaching the imaging portion with respect to a component parallel to a predetermined plane including a center optical axis of the image-forming portion of the diffuse reflected light. The light projecting portion projects the irradiation light such that when the irradiation light is specular reflected at the measuring target object existing in the measurement region, a component parallel to the predetermined plane of the specular reflected light of the irradiation light converges at a position in the direction of the center optical axis of the image-forming portion where the light shielding portion exists.

The "position in the direction of the center optical axis where the light shielding portion exists" includes a case in which the position of the light shielding portion in the direction of the center optical axis of the image-forming portion is at the same position at both ends in the incident angle range of the defined diffuse reflected light, and a case in which the position of the light shielding portion in the direction of the center optical axis of the image-forming portion is at different positions. If the light shielding portion is at different positions at both ends of the incident angle range of the defined diffuse reflected light, this includes a case in which the component parallel to the predetermined plane of the specular reflected light is converged in the range of the image-forming portion center optical axis direction where such positions exist.

Preferably, the light projecting portion applies a line beam towards the measuring target object existing in the measurement region as the irradiation light. The light receiving portion receives a reflected light of the line beam reflected at the surface of the measuring target object from a direction in which a distribution of the position of the reflected light image obtained in correspondence to the displacement of the surface of the measuring target object changes for a distribution of the beam in a line direction at the surface of the measuring target object. The predetermined plane is a plane being perpendicular to an incident plane including a center optical axis of the line beam applied from the light projecting portion and a center optical axis of the image-forming portion, and including the center optical axis of the image-forming portion.

Preferably, the light projecting portion applies a line beam towards the measuring target object existing in the measurement region as the irradiation light. The light receiving portion receives a reflected light of the line beam reflected at the surface of the measuring target object from a direction in which a distribution of the position of the reflected light image obtained in correspondence to the displacement of the surface of the measuring target object changes for a distribution of the beam in a line direction at the surface of the measuring target object. When a planar measuring target object is placed in the measurement region at an inclination within a measurement target range defined in advance, the predetermined plane is a plane parallel to the line direction at the surface of the measuring target object of the reflected light beam generated when the line beam from the light projecting portion is reflected at the surface of the measuring target object, and the center optical axis of the image-forming portion.

The "tilt within the measurement target range defined in advance" is the tilt within a measurable (defined as measuring target by specification) angle range of the measuring target object defined in advance based on specification and the like by the optical measurement device.

Preferably, the light shielding portion is formed with a circular opening having the center optical axis of the image-forming portion as a center. The light shielding shields the light on the outer side of the circular opening.

Preferably, the image-forming portion is configured by an assembled lens in which a plurality of lenses is combined. The light shielding portion is arranged between the lenses positioned at both ends with respect to a lined direction of the plurality of lenses.

Preferably, the image-forming portion is a single lens. A converging position in the direction of the center optical axis of the image-forming portion is inside the single lens for the component parallel to the predetermined plane of the specular reflected light of the irradiation light.

Preferably, the light shielding portion defines the incident angle range with respect to the center optical axis of the image-forming portion for the component parallel to the predetermined plane of the diffuse reflected light from an effective measurement range defined in advance at the surface of the measuring target object.

Preferably, the light projecting portion projects the light beam such that a beam width in a direction parallel to the predetermined plane gradually becomes smaller as the line beam advances from the light projecting portion towards the light receiving portion. The predetermined plane is a plane being perpendicular to an incident plane including a light projecting portion center optical axis of the line beam applied from the light projecting portion and an image-forming portion center optical axis serving as a center optical axis of the image-forming portion, and including the image-forming portion center optical axis.

According to the optical measurement device of the present invention, highly accurate measurement can be performed on the measuring target object in which an inclined surface or a curved surface exists at one part of the surface having a specular reflection component, or a tilted measuring target object.

BRIEF DESCRIPTION OF THE DRAWINGS

FIG. 4 is a block diagram showing an electrical hardware configuration of the sensor head unit 2;

FIGS. 11A and 11B are views describing the trajectory of the light beam diffuse reflected at the surface of the measuring target object;

FIGS. 12A and 12B are views describing the trajectory of the light projection beam reflected at the surface of the measuring target object;

FIGS. 14A and 14B are schematic views showing a configuration example of the light receiving optical system of the optical system shown in FIG. 13;

DETAILED DESCRIPTION

Figure 1:
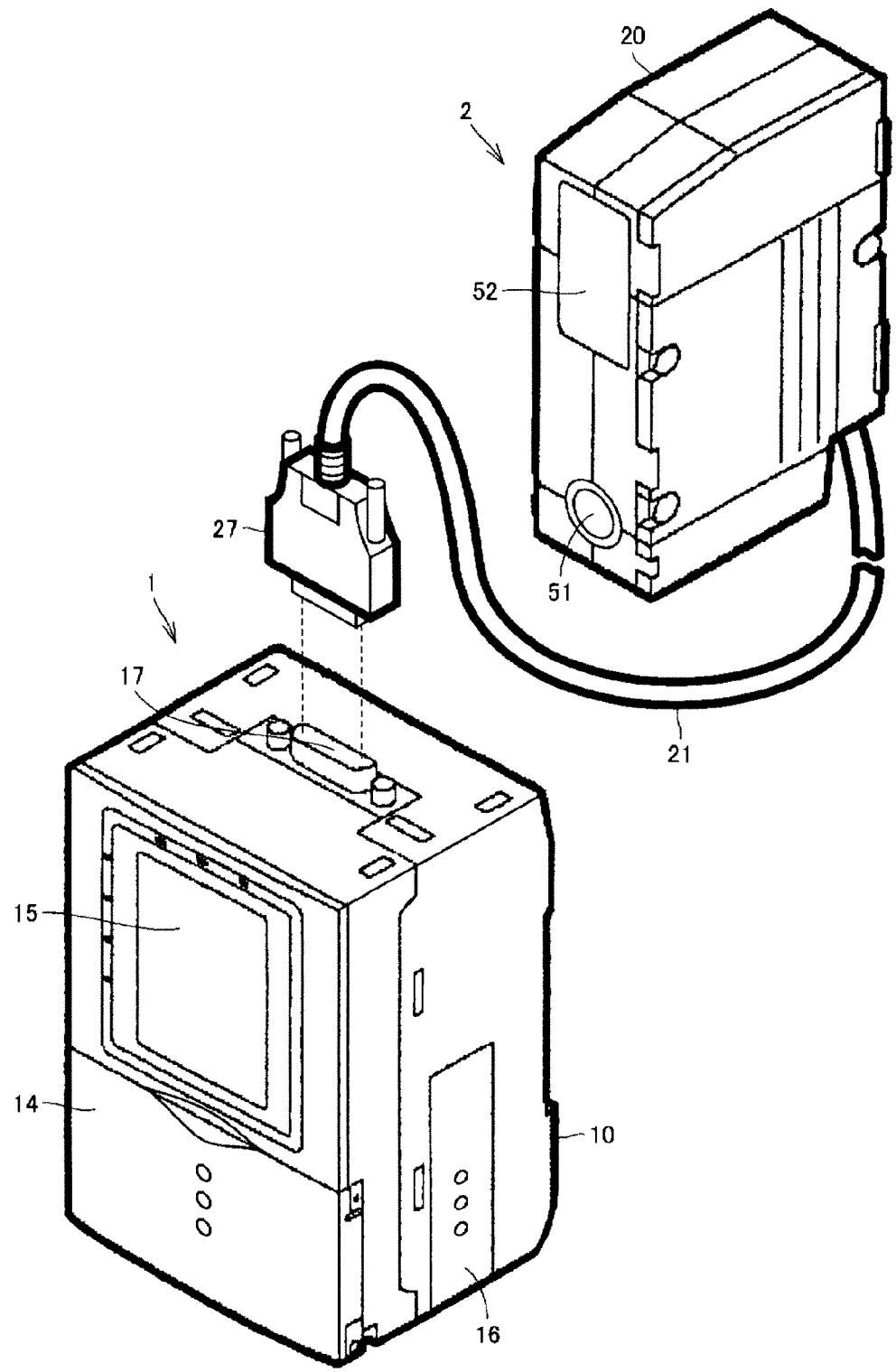
FIG. 1 is a perspective view of an outer appearance of a signal processing unit 1 and a sensor head unit 2 of an optical measurement device of the present embodiment.

Hereinafter, preferred embodiments of the present invention will be described with reference to the drawings. The same reference numerals will be given for the same or corresponding portions in the figures, and the description thereof will not be repeated.

[Configuration of Optical Measurement Device]

First, a schematic configuration of an optical measurement device (displacement sensor) according to the present embodiment will be described using FIGS. 1 to 4.

The optical measurement device of the present embodiment is a so-called amplifier separation type displacement sensor in which a signal processing unit and a sensor head unit are separated to enable compact accommodation to a control board and the like, and to facilitate the installation to a small measurement environment.

FIG. 1 is a perspective view of an outer appearance of a signal processing unit 1 and a sensor head unit 2 of the optical measurement device of the present embodiment. With reference to FIG. 1, an outer shell case 10 of the signal processing unit 1 has a slightly elongate rectangular solid shape. Although not illustrated, an external connection cord is pulled out from the front surface of the outer shell case 10. The external connection code includes an external input line, an external output line, a power supply line, and the like. The external input line externally provides various types of commands from a PLC (Programmable Logic Controller) and the like serving as a higher-level device to the signal processing unit 1. The external output line outputs a switching output, an analog output and the like generated inside the signal processing unit 1 to the PLC and the like. The power supply line supplies power to the internal circuits of the signal processing unit. Although not illustrated, the lower surface of the outer shell case 10 includes a USB (Universal Serial Bus) connector and an RS-232C connector.

An operation unit lid 14 that can be opened and closed is arranged at the upper surface of the outer shell case 10. An operation unit for performing various types of command operations and the like at the signal processing unit 1 is provided under the operation unit lid 14. A display unit 15 for displaying measuring target image information and measurement result acquired by the sensor head unit 2, measurement value, setting screen, and the like is arranged at the upper surface of the outer shell case 10.

An inter-signal processing unit connector lid 16 is arranged on the left and right side surfaces of the outer shell case 10. An inter-signal processing unit connector for connecting another signal processing unit 1 is arranged inside the inter-signal processing unit connector lid 16. A plurality of signal processing units 1 can be connected in a line while being adjacently coupled through a DIN rail. A sensor head unit connection connector 17 is arranged at the upper surface of the outer shell case 10 of the signal processing unit 1. The signal processing unit 1 is connected to the sensor head unit 2, to be hereinafter described, through the sensor head unit connection connector 17.

The sensor unit 2 includes a signal processing unit connection connector 27 corresponding to the sensor head unit connection connector 17, a cable 21, and a sensor head body unit 20.

The sensor head body unit 20 irradiates the measuring target object with laser light from a light projecting window 51, and receives the reflected light from the measuring target object at a light receiving window 52. The sensor head body unit 20 photographs the surface of the measuring target object from an angle at which the light image position appears to be changed according to the shape of the measuring target object, and outputs the photographed image data as a video signal.

Figure 2:
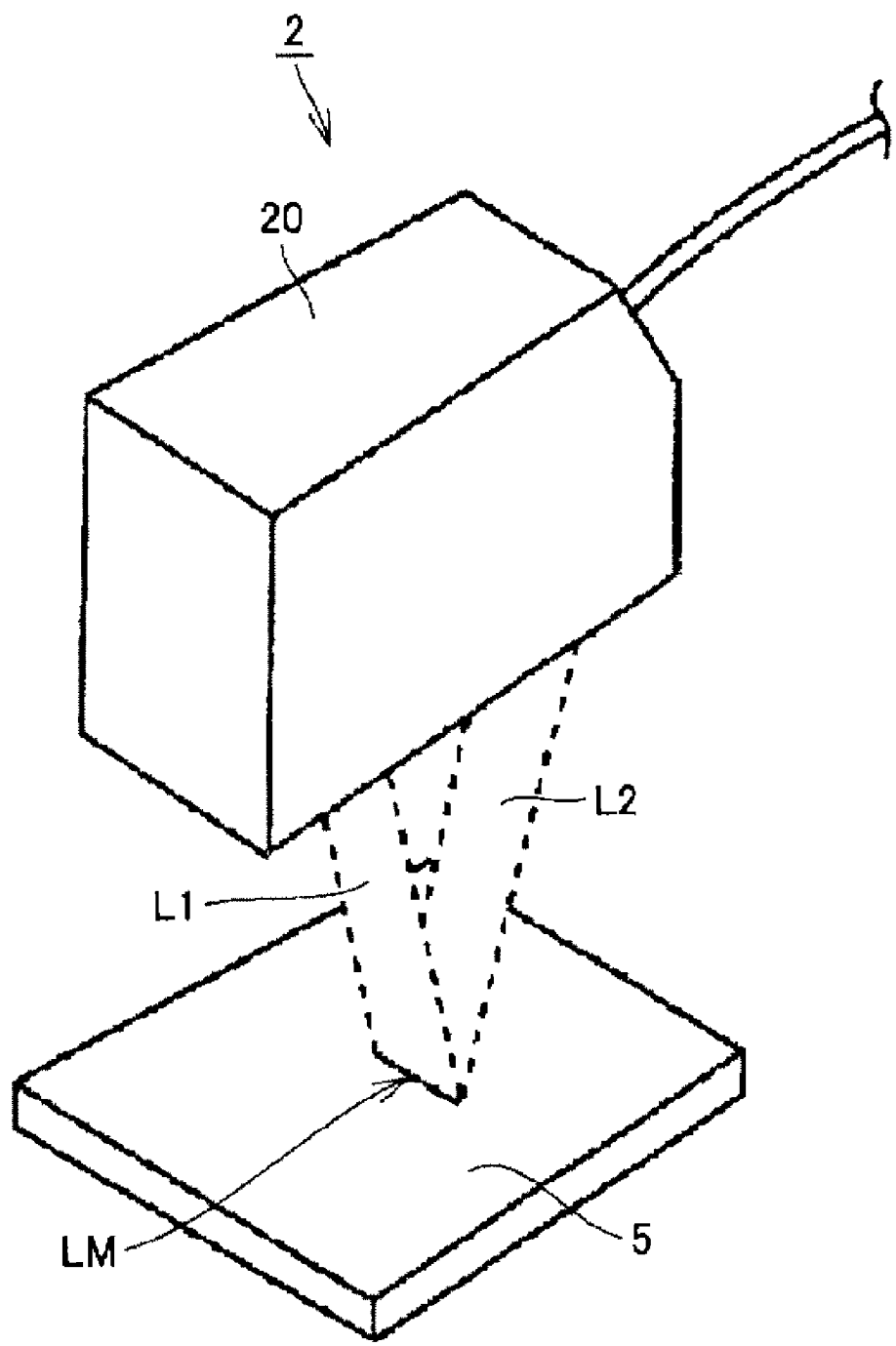
FIG. 2 is a view describing the laser light applied from a sensor head body unit.

FIG. 2 is a view describing the laser light applied from the sensor head body unit. As shown in FIG. 2, the pulse-form laser light exit from a light projecting element (laser diode) incorporated in the sensor head body unit 20 is passed through a light projecting lens (not illustrated), and the surface of the measuring target object 5 is irradiated with such laser light as a line beam L1. An irradiation light image LM of the line beam (hereinafter also referred to as sectional contour image) is thereby formed at the surface of the measuring target object 5.

The reflected light L2 of the line beam reflected at the measuring target object 5 passes through the light receiving lens (not illustrated) in the sensor head unit 2 and enters the two-dimensional imaging element (photodiode array, CCD, CMOS imaging element, etc.).

In other words, the video signal containing the irradiation light image LM of the line beam is acquired by photographing the surface of the measuring target object 5 with the two-dimensional imaging element from a direction different from the irradiating direction of the line beam. A predetermined feature quantity is extracted based on such video signal, and a distribution along the irradiation light image LM of the target displacement amount (distance between the sensor head body unit 20 and the measuring target object 5 in the example) is obtained.

Figure 3:
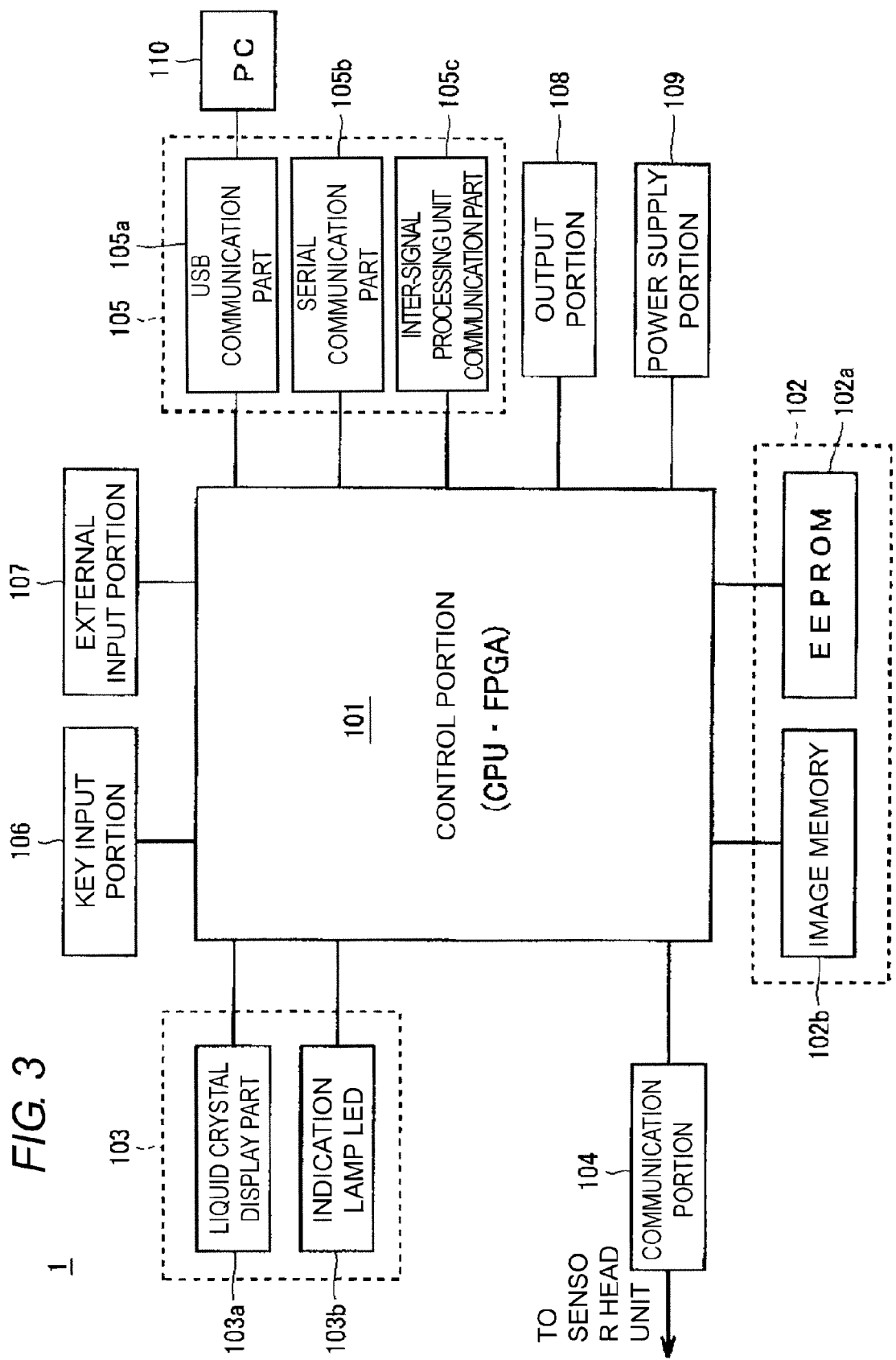
FIG. 3 is a block diagram showing an overall electrical hardware configuration of the signal processing unit 1 in FIG. 1.

FIG. 3 is a block diagram showing an overall electrical hardware configuration of the signal processing unit 1 in FIG. 1. As shown in FIG. 3, the signal processing unit 1 includes a control portion 101, a storage portion 102, a display portion 103, a communication portion 104 with the sensor head unit 2, a communication portion 105 with an external device, a key input portion 106, an external input portion 107, an output portion 108, and a power supply portion 109.

The control portion 101 is configured by the CPU (Central Processing Unit) and the FPGA (Field Programmable Gate Array), and performs a comprehensive control of the entire signal processing unit 1. The control portion 101 executes the above-described measurement process by implementing various types of functions, to be hereinafter described, based on the video signal from the sensor head unit 2, and also binarizes the video signal with a predetermined threshold value as a reference and sends out the same from the output portion 108 as output data.

The storage portion 102 includes a non-volatile memory (EEPROM) 102*a* and an image memory 102*b* for storing the image data to be displayed on the display portion 103. A flash memory may be used for the non-volatile memory 102*a*.

The display portion 103 includes a liquid crystal display part 103*a* on which various numerical values etc. related to the threshold value and the distance to the measuring target object are displayed, and an indication lamp LED 103*b* showing the ON/OFF state etc., which is the target output. The communication portion 104 communicates with the sensor head unit 2.

The communication portion 105 includes a USB communication part 105*a* for connecting to an external personal computer (PC) 110, a serial communication part 105*b* used in transmission and reception of commands and program data, and the like, and an inter-signal processing unit communication part 105*c* for performing data communication with an adjacent signal processing unit on the left or the right according to a predetermined protocol and a transmission/reception format.

The key input portion 106 is configured by a switch, an operation button and the like for various types of settings (not illustrated). The external input portion 107, for example, receives various types of commands with respect to the signal processing unit 1 from a higher-level device such as the PLC. The output portion 108 is used to output the target ON/OFF output to the higher-level device such as the PLC. The power supply portion 109 supplies power to the control portion 101 and the external hardware circuit.

FIG. 4 is a block diagram showing an electrical hardware configuration of the sensor head unit 2. As shown in FIG. 4, the sensor head unit 2 includes a control portion 201, a light projecting portion 202 for applying the line beam towards the measuring target object 5, a light receiving portion 203 for receiving the light beam reached after being reflected at the measured target object 5, an indication lamp LED 204, a storage portion 205, and a communication portion 206.

The control portion 201 is configured by the CPU (Central Processing Unit) and the PLD (Programmable Logic Device), and performs a comprehensive control of each configuring elements 202 to 206 of the sensor head unit 2 and also performs a process of retrieving the light reception signal from the light receiving portion 203 and sending the same to the signal processing unit 1.

The light projecting portion 202 includes a laser diode serving as a light projecting element and a light projecting circuit, and applies the line beam towards the measuring target region. Although not illustrated, the light projecting circuit has an APC (Auto Power Control) function, and monitors the light output of the laser diode and feeds back the result thereof to the drive current to supply the same to the laser diode, thereby maintaining the light output of the laser diode constant.

The light receiving portion 203 includes a two-dimensional imaging element (photodiode array, CCD, CMOS imaging element, etc.) for receiving the reflected light of the line beam and acquiring the image of the received light, and a light reception signal processing portion for amplifying the light reception signal obtained from the two-dimensional imaging element and outputting the same to the control portion 201 in synchronization with a timing control signal from the control portion 201. The indication lamp LED 204 is turned ON or OFF in correspondence to various operational states of the sensor head unit 2

The storage portion 205 is configured by a non-volatile memory (EEPROM) and the like, where an ID (identification information) and the like for identifying the sensor head unit 2 are recorded therein in the present example. The communication portion 206 communicates with the signal processing unit 1 according to the command of the control portion 201.

The sensor head unit 2 of the present embodiment has a circuit configuration described above, and performs an appropriate light projecting and receiving process in response to the command of the signal processing unit 1. The communication method between the communication portion 104 of the signal processing unit 1 and the communication portion 206 of the sensor head unit 2 is not particularly limited, and LVDS (Low Voltage Differential Signaling) can be applied, by way of example.

[Measurement Principle and Measurement Operation Example]

Figure 5:
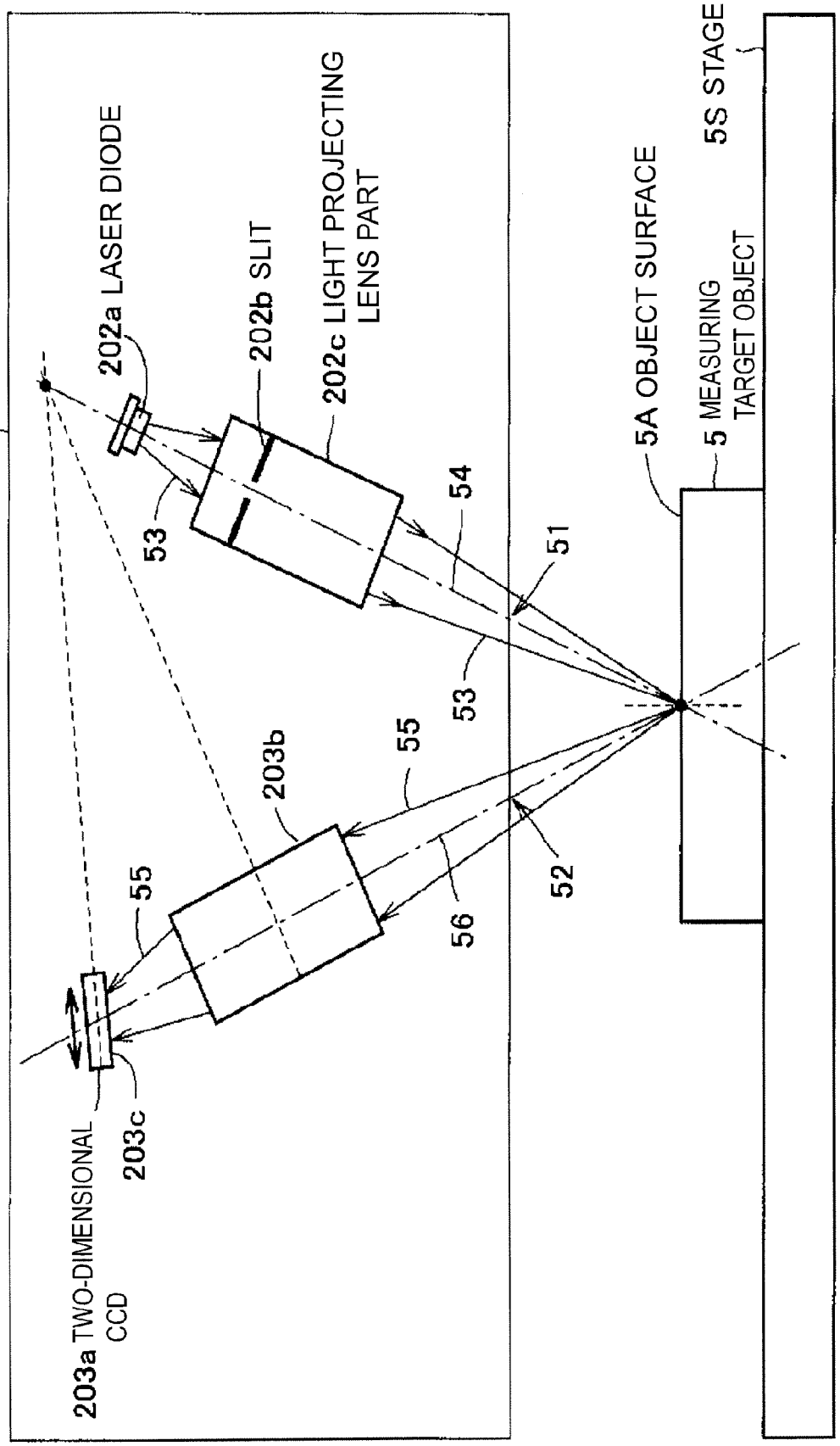
FIG. 5 is a view showing a sectional configuration of the optical system of the sensor head body unit 20.

FIG. 5 is a view showing a sectional configuration of the optical system of the sensor head body unit 20. With reference to FIG. 5, the optical system according to the present embodiment includes a laser diode 202*a*, a slit 202*b*, a light projecting lens part 202*c*, a two-dimensional CCD 203*a*, and a light receiving optical system 203*b*. The laser diode 202*a*, the slit 202*b*, and the light projecting lens part 202*c* configure the light projecting portion 202 shown in FIG. 4. In the present embodiment, the slit 202*b* is arranged inside the light projecting lens part 202*c*.

The light projection beam 53 (irradiation light) emitted from the laser diode 202*a* is shaped by the slit 202*b* and the light projecting lens part 202*c*, and projected onto a surface 5A of the measuring target object 5 existing in a predetermined measuring region as a line beam. The light projecting lens part 202*c* may be configured by a single lens or an anamorphic single lens (e.g., cylindrical lens), or may be an assembled lens in which plural lenses are combined or an assembled lens in which plural lenses including the anamorphic single lens (e.g., cylindrical lens) are combined. The line beam can be narrowed in the short-side direction of the line beam at the surface of the measuring target object 5 by using the anamorphic single lens for the light projecting lens.

Since the cross-sectional view is shown in FIG. 5, the light projection beam 53 is illustrated as if being narrowed as a converging light and applied to the measuring target object in the cross-section (on the plane of drawing), but the light projection beam 53 is applied to the measuring target object 5 as a linearly extending line beam in relation to the direction perpendicular to the cross-section (direction perpendicular to plane of drawing). An "irradiation region" in the following description is defined as the entire range (entire range that can be imaged with the two-dimensional imaging element) where the sectional contour image of the light projection beam 53 exists at the surface 5A of the measuring target object 5.

The sectional contour image generated by the irradiation of such light projection beam 53 (line beam) is photographed with the two-dimensional CCD 203a serving as the two-dimensional imaging element through the light receiving optical system 203b from a predetermined direction. In other words, the light receiving portion including the light receiving optical system 203b and the two-dimensional CCD 203a receives the reflected light of both the diffuse reflected light and the specular reflected light, which are generated when the light projection beam 53 is reflected at the surface 5A of the measuring target object 5, from a direction the position of the obtained reflected light image changes according to the displacement of the surface 5A of the measuring target object 5. The light receiving portion acquires the image of such reflected light image. The two-dimensional CCD 203a images the sectional contour image from a direction the image-forming position at an imaging plane 203c of the sectional contour image changes in correspondence to the change in the displacement of the surface 5A of the measuring target object 5. Thus, the displacement at each position of the sectional contour image along the direction perpendicular to the cross-section is measured based on the principle of triangulation.

The plane including the center optical axis of the light projection beam 53 (light projecting center axis 54), and the center optical axis of the light receiving optical system 203b (light receiving center axis 56) is hereinafter defined as "incident plane". The plane including the center axis of the sectional contour at the surface 5A of the planar measuring target object 5 and the light receiving optical axis corresponding to the center optical axis of the light receiving optical axis 203b is defined as "beam converging plane".

An axis that is parallel to the longitudinal direction of the line beam and that passes through the center of width in the short-side direction of the line beam, and an axis that is parallel in the short-side direction of the line beam and that passes through the center of width in the longitudinal direction of the line beam can both be applied as the center optical axis of the sectional contour image. In FIG. 5, the longitudinal direction of the line beam is the direction perpendicular to the plane of drawing, and the short-side direction of the line beam is a direction perpendicular to the longitudinal direction of the line beam and parallel to the plane of drawing.

The light receiving optical system 203b image-forms the reflected light beam 55 on the imaging plane 203c of the two-dimensional CCD 203a. In the present embodiment, the reflected light beam 55 is a specular reflected light of the light projection beam 53.

As shown in FIGS. 6A to 6D, the light receiving optical system 203b includes a lens portion 211 and a lens holder 213 for fixing the lens portion 211. The lens holder 213 may be an integrated structure, or a separated structure. The lens portion 211 image-forms the reflected light beam 55 on the imaging plane 203c. To illustrate this aspect, FIGS. 6A to 6D each show the incident side and the exit side of the reflected light beam 55. The illustrations in FIGS. 6A to 6D are examples, and the arrangement of the "incident side" and the "exit side" may be reversed.

Figure 6A:
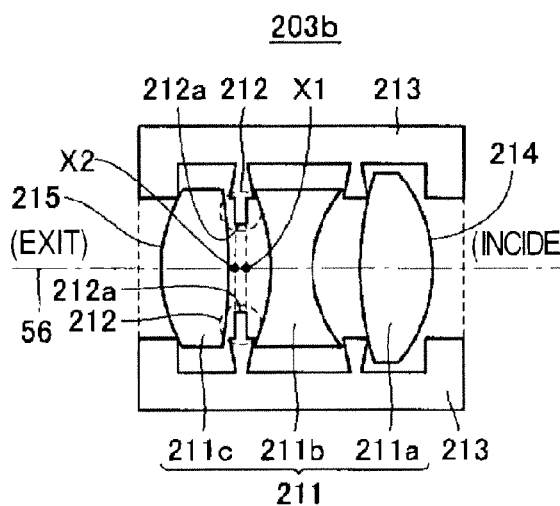
FIGS. 6A to 6D are views showing one example of a configuration of the light receiving optical system 203*b*.
Figure 6B:
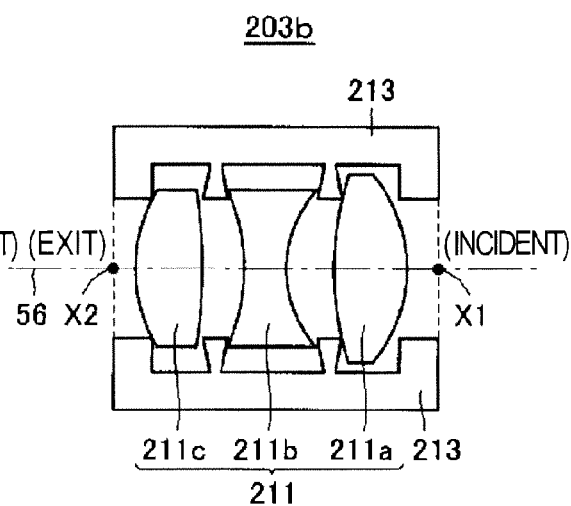
Figure 6C:
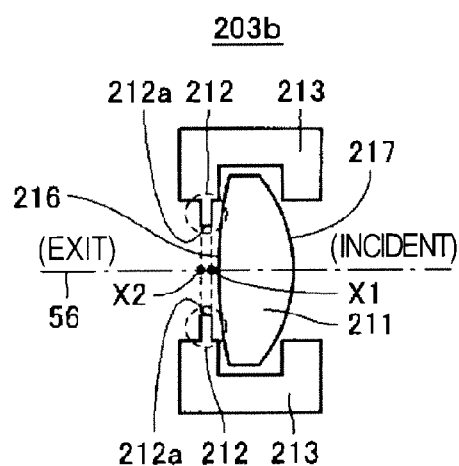
Figure 6D:
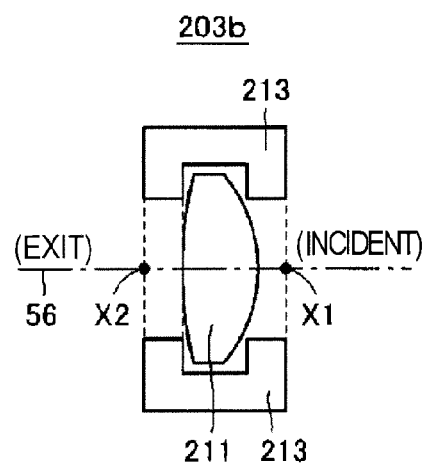

FIGS. 6A and 6B are views showing examples in which the lens portion 211 is configured by an assembled lens including a plurality of lenses 211a to 211c. FIGS. 6C and 6D are views showing examples in which the lens portion 211 is configured by a single lens. The number of lenses configuring the lens portion 211 is not particularly limited as long as the reflected light beam 55 can be image-formed on the imaging plane 203c. When configuring the lens portion 211 with a plurality of lenses, the type of each lens is not particularly limited.

According to the configuration shown in FIGS. 6A and 6C, the light receiving optical system 203b includes a light shielding portion 212 in addition to the lens portion 211 and the lens holder 213. The light shielding portion 212 is arranged between the refracting surfaces at the ends of the plurality of lenses 211a to 211c or the vicinity of the refracting surfaces, and is formed with a circular opening 212a. The light on the outer side of the circular opening is thus shielded by the light shielding portion 212.

The vicinity of the refracting surface refers to a distance range of an extent not contacting the refracting surface but defining the range of light that substantially enters the refracting surface. The light shielding portion 212 may be integrally arranged on the lens holder. The refracting surfaces at both ends of the lenses 211a to 211c are specifically the lens surface 214 of the lens 211a directed to the "incident side" and the lens surface 215 of the lens 211c directed to the "exit side".

In FIG. 6A, the light shielding portion 212 is arranged between the lens 211b and the lens 211c, but may be arranged between the lens 211a and the lens 211c. Thus, in the present embodiment, the light shielding portion 212 is arranged between the lenses positioned at both ends with respect to the lined direction of the plurality of lenses. The light shielding portion may be arranged in plurals between the vicinity of the refracting surfaces at both ends of the lenses 211a and 211c. In the configuration shown in FIG. 6C, the light shielding portion 212 is arranged in the vicinity of the refracting surface (lens surface 216) of the "exit side", but the light shielding portion 212 may be arranged in the vicinity of the refracting surface (lens surface 217) of the "incident side" of the lens portion 211 shown in FIG. 6C.

In the configuration shown in FIGS. 6B and 6D, the lens holder 213 also has the function of the light shielding portion. Specifically describing, the peripheral edge of the lenses 211a to 211c is covered by the lens holder 213.

The lens axis is shown in each of FIGS. 6A to 6D, and such lens axis corresponds to the light receiving center axis 56. Furthermore, the range from position X1 to position X2 on the light receiving center axis 56 corresponds to the range defined as a range of the light shielding portion on the light receiving center axis 56. If the light shielding portion 212 is arranged separate from the lens holder 213 as in the configuration shown in FIGS. 6A and 6C, the range of the light shielding portion becomes, for example, the range of the light receiving center axis 56 corresponding to the thickness of the light shielding portion 212. If the lens holder 213 also has the function of the light shielding portion 212 as in the configuration shown in FIGS. 6B and 6D, the range of the light shielding portion on the light receiving center axis 56 is defined by the lens holder 213.

When arranging the light shielding portion 212 in plurals, the range of the light shielding portion on the light receiving center axis 56 may be defined by the two light shielding portions positioned at both ends of the plurality of light shielding portions 212. The range of the light shielding portion on the light receiving center axis 56 is not necessarily limited to having a spread, and may be a specific position such as position X1 or position X2 shown in FIGS. 6A to 6D.

Figure 7:
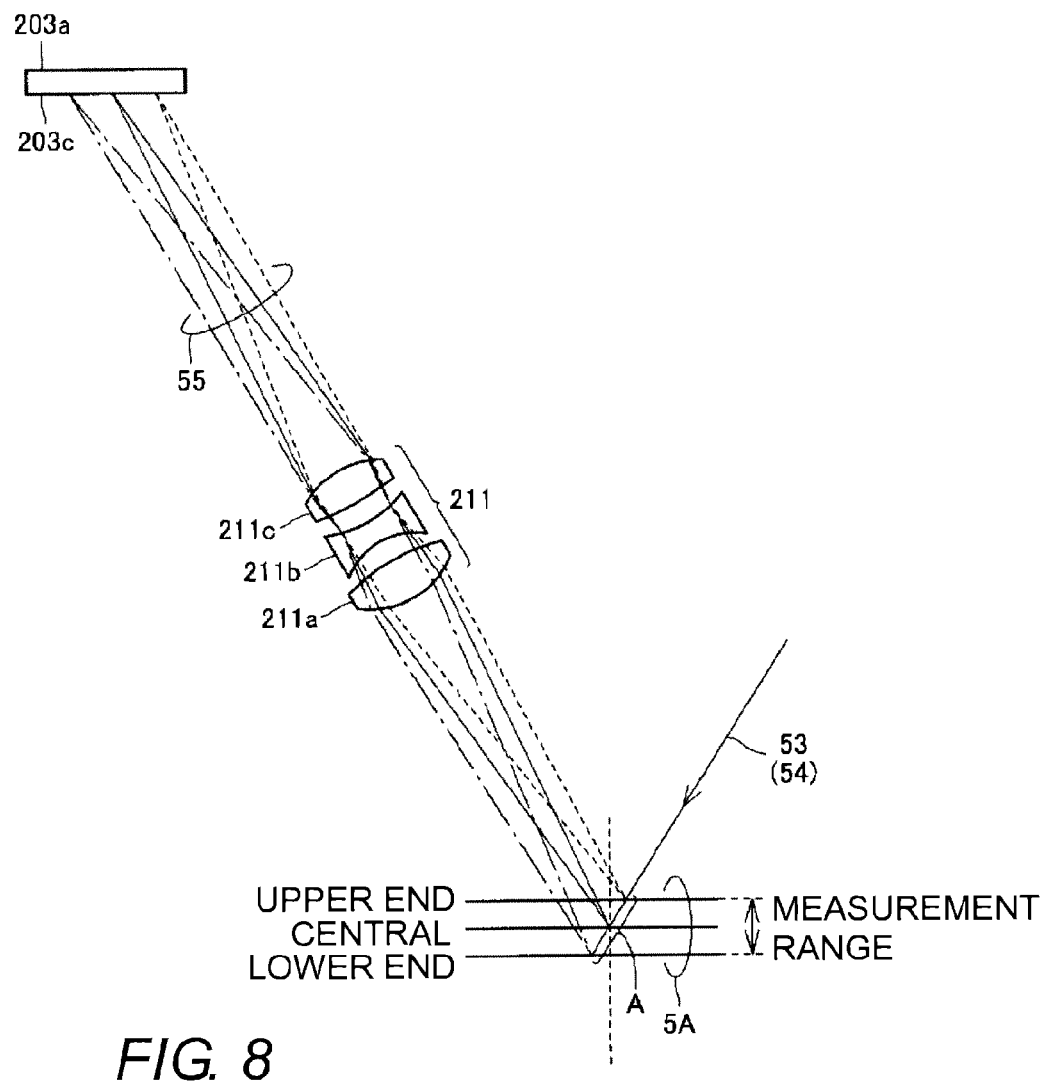
FIG. 7 is a schematic view showing the arrangement of the light receiving portion according to the law of shine proof.

Returning back to FIG. 5, the two-dimensional CCD 203a is arranged so that the imaging plane 203c obliquely inclines slightly from the direction perpendicular to the light receiving center axis 56, where such arrangement uses the law of shine proof. As shown in FIG. 7, the imaging plane 203c and the light projecting center axis 54 are in a non-parallel relationship. The imaging plane 203c and the lens surface (surface perpendicular to the optical axis of the lens portion 211) are also in a non-parallel relationship. However, if the light projecting center axis 54 and the light receiving center axis 56 are perpendicularly arranged, the imaging plane 203c will be arranged perpendicular to the light receiving center axis 56, and the imaging plane 203c and the light projecting center axis 54 will be in a parallel relationship and the imaging plane 203c and the lens surface (plane perpendicular to the optical axis of the lens portion 211) will be in a parallel relationship, as an exception. In FIG. 7, the light projection beam 53 is shown overlapping the light projecting center axis 54 to facilitate the understanding of the description.

Although not illustrated in FIG. 7, the two-dimensional CCD 203a and the lens portion 211 are arranged so that the light projecting center axis 54, the imaging plane 203c and the lens surface intersect on one axis. As an exception, if the light projecting center axis 54 and the light receiving center axis 56 are perpendicularly arranged, the light projecting center axis 54, the imaging plane 203c, and the lens surface are all arranged in parallel. According to such arrangement relationship, when measuring the displacement (step) in an irradiation region A, the upper end position, the central position, and the lower end position of the measurement range of the relevant step all can be focused. The displacement of the surface of the measuring target object then can be accurately measured.

The measurement of the step of the measuring target object having a hog-backed shape (semicircle deformed to flat form) will be described, by way of example, with reference to FIGS. 8 and 9.

Figure 8:
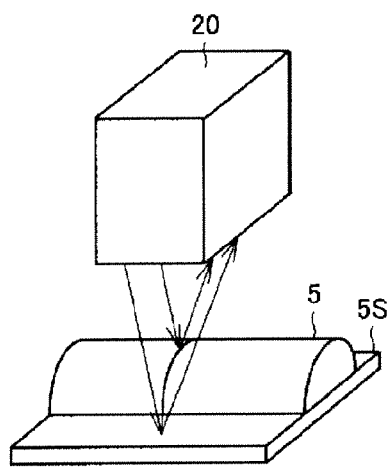
FIG. 8 is a view showing the irradiation light and the reflected light from and to the sensor head body unit.

FIG. 8 is a view showing the irradiation light and the reflected light from and to the sensor head body unit. FIG. 9 is a view showing an image obtained by imaging the reflected light as the sectional contour image with the two-dimensional imaging element.

Figure 9:
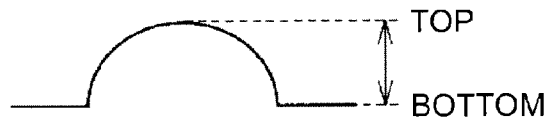
FIG. 9 is a view showing an image obtained by imaging the reflected light as the sectional contour image with the two-dimensional imaging element.

When the surface of the measuring target object irradiated with the laser light is photographed as shown in FIG. 8, a sectional contour image as shown in FIG. 9 in which the position of the luminescent point on the light receiving surface of the two-dimensional imaging element changes according to the surface height is obtained. When the height of the object surface changes, the image moves in a predetermined direction (displacement direction) on the light receiving surface of the imaging element. The difference between the top and the bottom on the object surface irradiated with each line beam can be calculated from such image, and the step at the surface of the measuring target object, that is, the displacement at an arbitrary point of the portion irradiated with the line beam can be measured by performing the calculation using the irradiation angle and the light reception angle. The measurement process based on the sectional contour image is executed by the signal processing unit 1 (see FIGS. 1, 3).

The height of the projection at the object surface or the depth of the groove formed at the object surface can be measured through the method similar to the above method for measuring the step. The width of the projection or the groove can also be measured with the above method.

[Optical System of Present Embodiment]

Figure 10A:
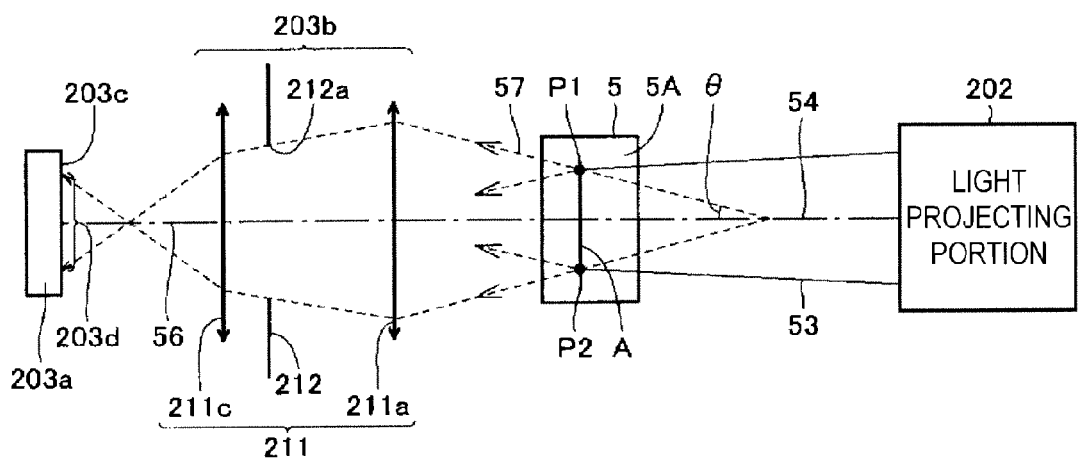
FIGS. 10A and 10B are schematic configuration diagrams showing the optical system of the present embodiment along a direction parallel to the beam converging surface.
Figure 10B:
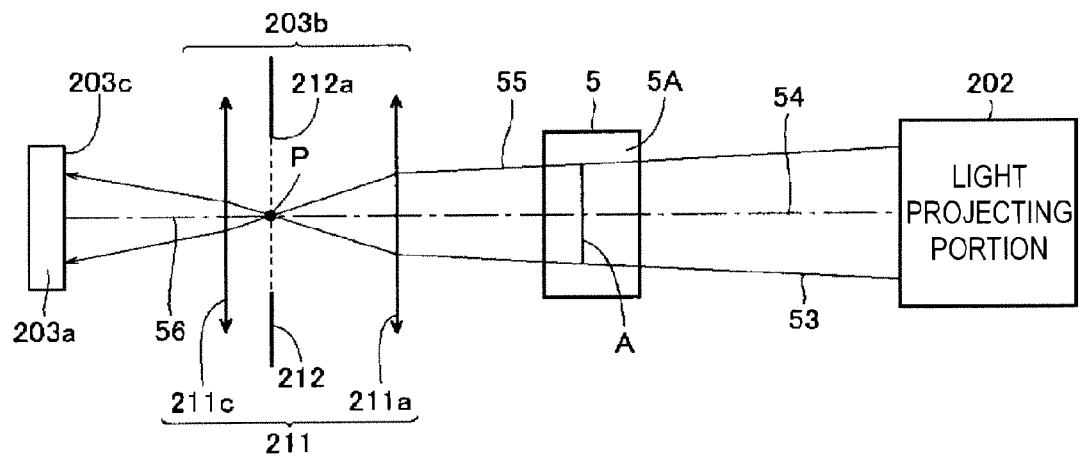

FIGS. 10A and 10B are schematic configuration diagrams showing the optical system of the present embodiment along a direction parallel to the beam converging surface. With reference to FIGS. 10A and 10B, the optical system of the present embodiment includes the light projecting portion 202, the light receiving optical system 203b, and the two-dimensional CCD 203a serving as the imaging portion. The light projecting portion 202 projects the light projection beam 53, which becomes linear at the surface 5A of the measuring target object 5, to the measuring target object 5. The light receiving optical system 203b image-forms the reflected light at the surface (irradiation region A) of the measuring target object 5 of the light projection beam 53 on the imaging plane 203c of the two-dimensional CCD 203a. The beam converging surface corresponds to "predetermined plane" in the present invention. In the optical system shown in FIGS. 10A and 10B, the beam converging surface is perpendicular to the incident plane.

The light receiving optical system 203b includes the lens portion 211 and the light shielding portion 212. In FIGS. 10A and 10B, only the lenses 211a, 211c are schematically shown for the lens portion 211, and the lenses 211a, 211c are schematically shown as a thin lens. In FIGS. 10A and 10B, the light shielding portion 212 is arranged separate from the lens holder 213, but the lens holder 213 may also have the function of the light shielding portion 212, as mentioned above.

Of the diffused light generated when the light projection beam 53 is diffuse reflected at each point of the irradiation region A (points P1, P2 positioned at both ends of the irradiation region A are representatively shown), the component in the direction parallel to the beam converging surface is assumed as the diffuse reflected light 57.

When the light projection beam 53 is diffuse reflected at the measuring target object 5 existing in the measurement region, the light shielding portion 212 defines the incident angle range with respect to the light receiving center axis 56 of the diffuse reflected light 57 reaching the two-dimensional CCD 203a for the component parallel to the beam converging surface of the diffuse reflected light. Specifically, the maximum angle θ formed by the advancing direction of the diffuse reflected light 57 and the light receiving center axis 56 when the diffuse reflected light 57 passes through the opening 212a of the light shielding portion 212 is defined by the diameter of the opening 212a (FIG. 10A).

In FIG. 10A, the trajectory of the diffuse reflected light 57 after the diffuse reflected light 57 enters the light receiving optical system 203b is shown. The diffuse reflected light 57 is image-formed within an imaging region 203d of the imaging plane 203c by the light receiving optical system 203b. The imaging region 203d is included in a region (effective imaging region) defined in advance as an imageable region of the imaging plane 203c. The two-dimensional CCD 203a can acquire the light image of the surface 5A of the measuring target object 5 by forming the light image within the effective imaging region. The displacement thus can be measured, and hence a range (region) where the light image can be formed within the effective imaging region of the irradiation region A is hereinafter referred to as "effective measurement range". As described above, the effective measurement region is defined in advance based on the effective imaging region of the imaging plane 203c.

As shown in FIG. 10B, the component parallel to the beam converging surface of the light projecting bean specular reflected at the irradiation region A is the reflected light beam 55. The light projecting portion 202 projects the light projection beam 53 such that the reflected light beam 55 converges at a position in the direction of the light receiving center axis 56 where the light shielding portion 212 exists. In other words, a converging position P on the light receiving center axis 56 of the reflected light beam 55 is within the range defining the light shielding portion 212 on the light receiving center axis 56.

The position in the direction of the light receiving center axis 56 where the light shielding portion 212 exists includes both when the position of the light shielding portion 212 in the direction of the light receiving center axis 56 is at the same position at both ends in the incident angle range of the defined diffuse reflected light, and when such position is at different positions. A case in which the light shielding portion 212 is at different positions at both ends in the incident angle range of the defined diffuse reflected light 57 includes a case in which the reflected light beam 55 converges within the range in the direction of the light receiving center axis 56 where the different positions exist.

In FIGS. 10A and 10B, the range defining the light shielding portion 212 is shown with one point, but the range defining the light shielding portion 212 on the light receiving center axis 56 is not limited to one point as shown in FIGS. 6A to 6D, and may have a width of a certain extent.

The "converging position" is shown as a position where light converges to one point in FIGS. 10A and 10B, but is not limited thereto. For instance, the relevant position may be the position where the beam width in the beam converging surface direction of the reflected light beam 55 becomes a minimum or a position in the vicinity thereof. The relevant position may also be a range including the position where the beam width becomes a minimum and the vicinity thereof. All positions where the reflected light beam 55 can be assumed to be in the converged state may be the "converging position".

The light projecting portion 202 may project the light projection beam 53 in which the beam width in the beam converging surface direction becomes a constant, but in the present embodiment, the light projecting portion 202 projects the light projection beam 53 so that the beam width in the beam converging surface direction gradually becomes smaller as the light projection beam 53 advances from the light projecting portion 202 towards the light receiving optical system 203b. The physical diameter of the lens portion 211 (lenses 211a to 211c) can be reduced by projecting the light projection beam 53 so that the beam width gradually becomes smaller. Therefore, the sensor head body unit 20 including the optical system shown in FIGS. 10A and 10B can be miniaturized.

The configurations show in FIGS. 10A and 10B show one mode of the optical system according to the present embodiment, and the above relationship is satisfied for the component parallel to the beam converging surface of the diffuse reflected light and the specular reflected light. The optical system according to the present embodiment is configured such that the component parallel to the "predetermined plane" including the light receiving center axis 56 satisfies the above relationship for the diffuse reflected light and the specular reflected light. In other words, in the present embodiment, the "predetermined plane" including the light receiving center axis 56 can be defined to other than the beam converging surface. In this case as well, the light shielding portion 212 defines, for the component parallel to the predetermined plane of the diffuse reflected light, the incident angle range with respect to the light receiving center axis 56 of the diffuse reflected light reaching the two-dimensional CCD 203a among the relevant diffuse reflected light. Further, the light projecting portion 202 projects the light projection beam 53 so that the component parallel to the predetermined plane of the specular reflected light converges at a position in the direction of the light receiving center axis 56 where the light shielding portion 212 exists.

The optical system according to the present embodiment will now be described in detail with reference to FIGS. 11A and 11B and FIGS. 12A and 12B.

FIGS. 11A and 11B are views describing the trajectory of the light beam diffuse reflected at the surface of the measuring target object. FIG. 11A is a view showing a case in which the lens holder 213 also has the function of the light shielding portion, and FIG. 11B is a view showing a case in which the light shielding portion is arranged separate from the lens holder 213.

With reference to FIGS. 11A and 11B, points P1, P2 correspond to points P1, P2 shown in FIGS. 10A and 10B, respectively, and correspond to the positions at both ends of the line beam irradiated to the irradiation region A. The diffuse reflected lights 57a, 57b are lights generated when the line beam is diffuse reflected at the points P1, P2, and are image-formed on the imaging plane 203c by the light receiving optical system 203b. FIGS. 11A and 11B show the trajectory in the beam converging surface direction of the diffuse reflected lights 57a, 57b.

With reference to FIG. 11A, the angle θ1 shows a maximum inclination angle of the diffuse reflected light 57a in the beam converging surface direction when the diffuse reflected light 57a enters the light receiving optical system 203b. The angle θ2 shows a maximum inclination angle of the diffuse reflected light 57b in the beam converging surface direction when the diffuse reflected light 57b enters the light receiving optical system 203b. The "inclination of the diffuse reflected light in the beam converging surface direction" refers to a state in which the advancing direction of the diffuse reflected light is rotated on the beam converging surface with an axis perpendicular to the beam converging surface as a center.

In FIG. 11A, since one part of the lens holder 213 functions as a shielding site of the diffuse reflected lights 57a, 57b, the maximum inclination angle of the diffuse reflected light in the beam converging surface direction is defined by such shielding site. In other words, the angle θ1 is defined by the shielding sites 213a, 213b, and the angle θ2 is defined by the shielding sites 213c, 213d.

In the configuration shown in FIG. 11B, the maximum inclination angle of the diffuse reflected light in the beam converging surface direction is defined by the opening 212a of the light shielding portion 212. The angle θ1a shows the maximum inclination angle of the diffuse reflected light 57a in the beam converging surface direction when the diffuse reflected light 57a enters the light receiving optical system 203b, and the angle θ2a shows the maximum inclination angle of the diffuse reflected light 57b in the beam converging surface direction when the diffuse reflected light 57b enters the light receiving optical system 203b.

FIGS. 12A and 12B are views describing the trajectory of the light projection beam reflected at the surface of the measuring target object. FIG. 12A is a view describing the converging position in the beam converging surface direction of the reflected light beam. The converging position P of the reflected light beam 55 is in a range defined by the light shielding portion 212 on the light receiving center axis 56. Specifically, the converging position P is at substantially the center in the range of the light receiving center axis 56 defined as the thickness of the light shielding portion 212.

FIG. 12B is a view showing a state in which the light projection beam is tilted by the tilt of the measuring target object 5. FIG. 12B shows a component in the beam converging surface direction of the reflected light beam 55, similar to FIG. 12A. With reference to FIG. 12B, when the measuring target object 5 tilts than the state shown in FIG. 12A, the reflected light beam 55 also tilts as the light projection beam tilts. As the reflected light beam 55 tilts, one part thereof is shielded by the light shielding portion 212, and ultimately, the entire reflected light beam 55 is shielded by the light shielding portion 212.

The measurement of satisfactory accuracy can be performed even when the measurement object is tilted or when one part of the surface of the measurement object is an inclined surface (or spherical surface) by configuring the optical system in the above manner. In this regards as well, description will be made by comparing with the case in which the converging position of the reflected light beam does not exist in the range of the light shielding portion.

Figure 13:
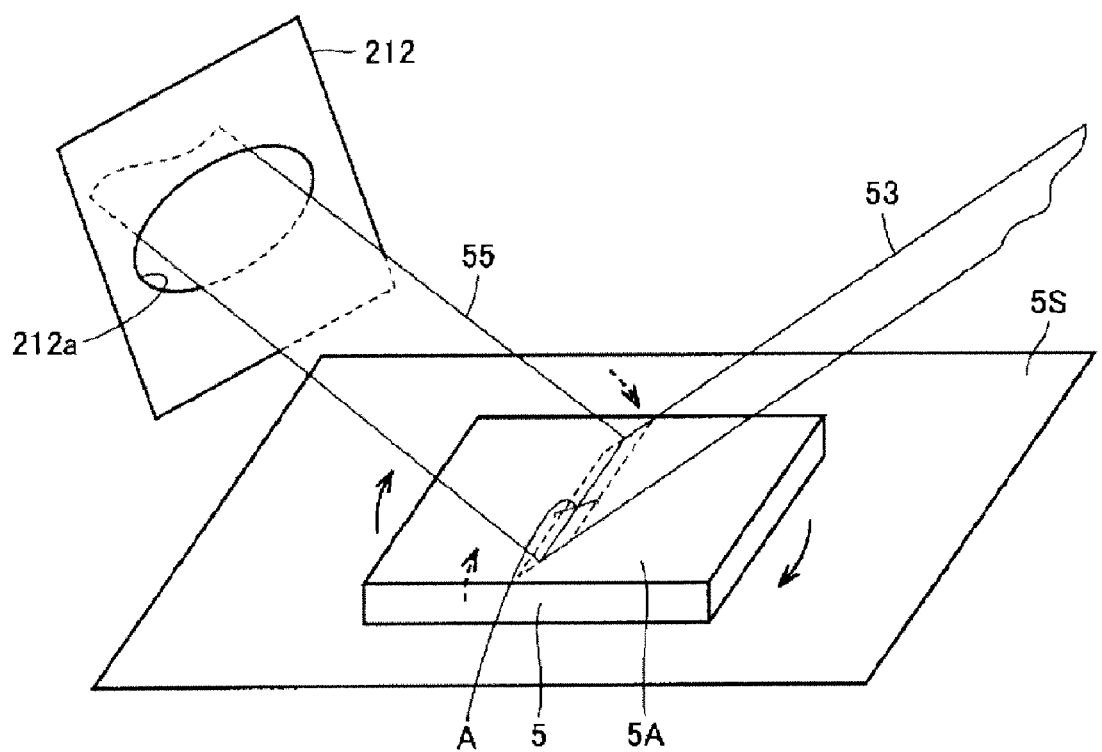
FIG. 13 is a view describing a state in which the converging position of the reflected light beam does not exist in the range of the light shielding portion.

FIG. 13 is a view describing a state in which the converging position of the reflected light beam does not exist in the range of the light shielding portion. With reference to FIG. 13, the light projection beam 53 is specular reflected at the surface 5A of the measuring target object 5 mounted on a stage 5S. The reflected light beam 55 generated by the specular reflection of the light projection beam 53 passes through the opening 212a of the light shielding portion 212. The opening 212a is circular. In this optical system, the reflected light beam 55 passes through the opening 212a of the light shielding portion 212 with the beam width in the beam converging surface direction constant. In this case, the reflected light beam 55 converges after passing through the opening 212a of the light shielding portion 212, and thus the converging position is on the outer side of the light shielding portion 212. FIG. 13 shows the irradiation region A serving as an entire range (entire range that can be imaged with a two-dimensional CCD 203a (not shown in FIG. 13)) where the sectional contour image of the light projection beam 53 exists.

FIG. 13 shows a state in which the measuring target object 5 is correctly mounted on the stage 5S. In this state, the reflected light beam 55 can pass through the opening 212a without being shielded by the peripheral edge of the opening 212a.

However, the measuring target object 5 sometimes tilts. For instance, when there is a step on the stage 5S or when a foreign substance is sandwiched between the stage 5S and the measuring target object 5, the measuring target object 5 is mounted on the stage 5S with the surface 5A tilted. Therefore, inclination occurs in the left and right direction (equal to left and right direction in the plane of drawing) as shown with an arrow of solid line, or inclination occurs in the front and back direction (equal to direction perpendicular to the plane of drawing) of the measuring target object 5 as shown with an arrow of broken line. When the measuring tart object 5 is inclined, one part of or the entire reflected light beam 55 is shielded by the light shielding portion 212 since the advancing direction of the reflected light beam 55 changes.

When the measuring target object 5 is tilted in the longitudinal direction of the line beam (when tilted in the direction of the arrow of the broken line shown in FIG. 13), the sectional contour image tilts obliquely. Furthermore, the light projection beam 53 is assumed to converge at the surface 5A of the measuring target object 5 in the short-side direction, and advance while spreading after being reflected at the surface 5A of the measuring target object 5.

FIGS. 14A and 14B are schematic views showing a configuration example of the light receiving optical system of the optical system shown in FIG. 13. In the configuration shown in FIGS. 14A and 14B, the lens holder 213 also has the function of the light shielding portion. FIGS. 14A and 14B also show a trajectory of the reflected light beam 55 along the beam converging surface direction. With reference to FIG. 14A, a converging position Pa of the reflected light beam 55 is on the outer side of the lens holder 213 (light shielding portion).

Figure 15:
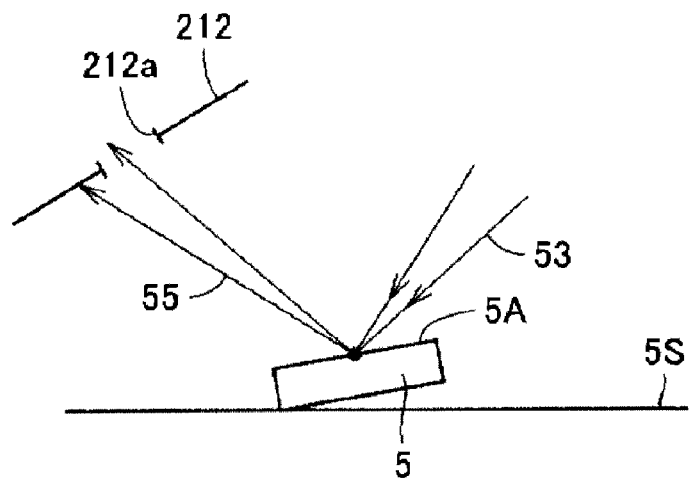
FIG. 15 is a schematic view showing the trajectory of the reflected light beam when the measuring target object 5 is inclined in the left and right direction of the measuring target object 5 in the optical system shown in FIG. 13.
Figure 17:
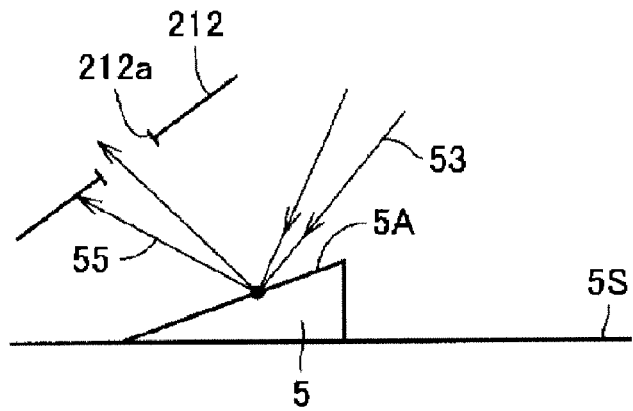
FIG. 17 is a schematic view showing the trajectory of the reflected light beam when the surface of the measuring target object is inclined.
Figure 18:
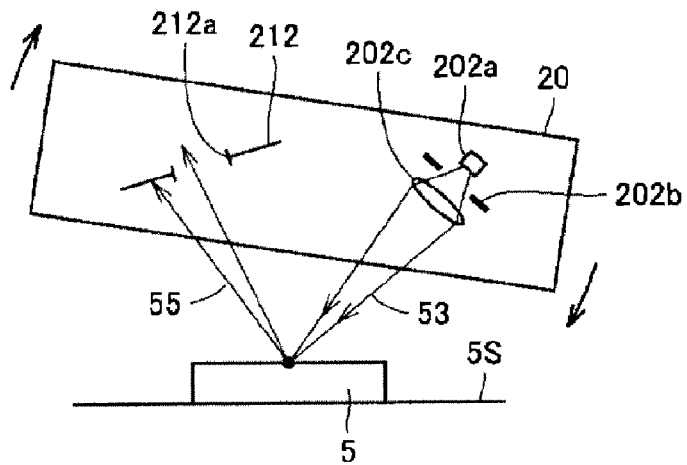
FIG. 18 is a view showing a state in which the sensor head body unit 20 is tilted in the left and right direction of the measuring target object 5.

FIG. 14B is a view showing a state in which the light projection beam tilts when the measuring target object 5 tilts in the optical system shown in FIG. 14A. With reference to FIG. 14B, when the measuring target object 5 tilts than the state shown in FIG. 14A, the reflected light beam 55 tilts as the light projection beam (not illustrated) tilts. As the reflected light beam 55 tilts, one part thereof is shielded by the light shielding portion 212, and ultimately, the entire reflected light beam 55 is shielded by the light shielding portion 212. Compared to the configuration shown in FIG. 12, the inclination angle (angle with respect to light receiving center axis 56) of the reflected light beam 55 in a case where one part of the reflected light beam 55 starts to be shielded by the light shielding portion 212 becomes small. The problems shown in FIGS. 15 to 18 above thus easily occur. FIGS. 15, 17, and 18 show the component parallel to the incident plane of the light projection beam 53 and the reflected light beam 55.

FIG. 15 is a schematic view showing the trajectory of the reflected light beam when the measuring target object 5 is inclined in the left and right direction of the measuring target object 5 in the optical system shown in FIG. 13. As shown in FIG. 15, one part of the reflected light beam 55 is shielded by the light shielding portion 212. Thus, the light receiving amount of the two-dimensional CCD (not shown in FIG. 15) is reduced. Furthermore, diffracted light 58 (see FIG. 15) is generated at the peripheral edge portion of the opening 212a. The diffracted light 58 may enter the two-dimensional CCD through the light receiving lens. Due to such reasons, error may occur in the measurement result.

Figure 16:
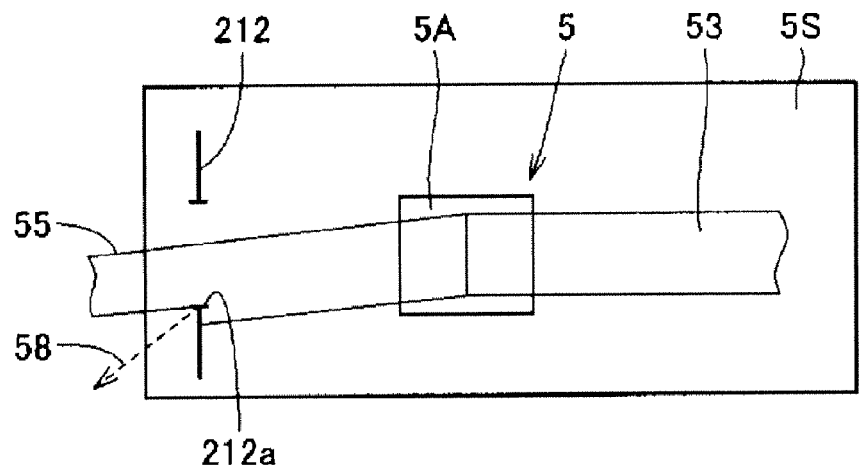
FIG. 16 is a schematic view showing the trajectory of the reflected light beam when the measuring target object 5 is inclined in the front and back direction of the measuring target object 5 in the optical system shown in FIG. 13.

FIG. 16 is a schematic view showing the trajectory of the reflected light beam when the measuring target object 5 is inclined in the front and back direction of the measuring target object 5 in the optical system shown in FIG. 13. As shown in FIG. 16, one part of the reflected light beam 55 is shielded by the light shielding portion 212. Thus, the light receiving amount of the two-dimensional CCD (not shown in FIG. 16, hereinafter the same) is reduced. Furthermore, the diffracted light 58 is generated at the peripheral edge portion of the opening 212a. The diffracted light 58 may enter the two-dimensional CCD through the light receiving lens (not shown). Due to such reasons, error may occur in the measurement result.

Furthermore, when one part of the surface of the measuring target object is an inclined surface (or curved surface), a state similar to the state shown in FIG. 15 or FIG. 16 may occur when the inclination angle (or curvature) of such surface becomes large. FIG. 17 is a schematic view showing the trajectory of the reflected light beam when the surface of the measuring target object is inclined. As shown in FIG. 17, when the inclination (or curvature) of the surface 5A (irradiation region) of the measuring target object 5 becomes large, one part of the reflected light beam 55 is shielded by the light shielding portion 212.

As shown in FIG. 18, the sensor head body unit 20 itself may be inclined even if the measuring target object 5 is correctly mounted on the stage 5S. When the reflected light beam 55 is a parallel light as shown in FIG. 18, one part of the reflected light beam 55 is shielded by the light shielding portion 212 due to the inclination of the sensor head body unit 20.

To solve such problem, consideration is made in increasing the diameter of the opening 212a. The tolerable range of the incident angle of the reflected light beam (parallel light beam) thus can be spread. However, the aberration (e.g., spherical aberration) of the lens arranged at the post stage of the light shielding portion 212 cannot be ignored if the aperture is widened. In other words, the light image blurs at the imaging plane of the two-dimensional CCD due to the aberration. The problem in that the measurement accuracy lowers thereby arises.

In order to solve the problem that the light image on the imaging plane blurs, a method of correcting the spherical aberration by the aspherical lens is considered. However, the physical diameter of the aspheric lens needs to made large when attempting to enlarge the aperture of the light shielding portion while ensuring the distance (i.e., working distance) of the sensor head body unit 20 and the measuring target object 5. Thus, a problem in that the sensor head body unit 20 becomes large newly arises.

The problem shown in FIG. 18 can be solved by correcting the tilt of the sensor head body unit 20. However, when the problem shown in FIGS. 15 to 17 arises even if the tilt of the sensor head body unit 20 is small, the tilt of the sensor head body unit 20 needs to be corrected. The trouble required for such correction is assumed to be large.

Figure 19:
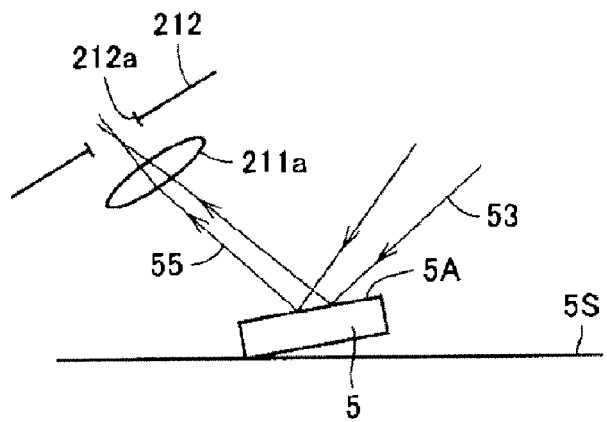
FIG. 19 is a schematic view showing the trajectory of the reflected light beam when the measuring target object 5 is inclined in the left and right direction of the measuring target object 5 in the present embodiment.
Figure 21:
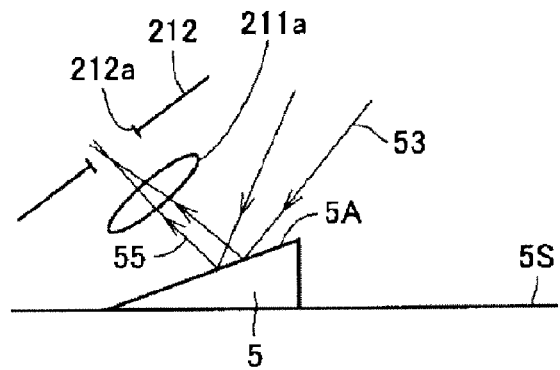
FIG. 21 is a schematic view showing the trajectory of the reflected light beam when the surface of the measuring target object is inclined in the present embodiment.
Figure 22:
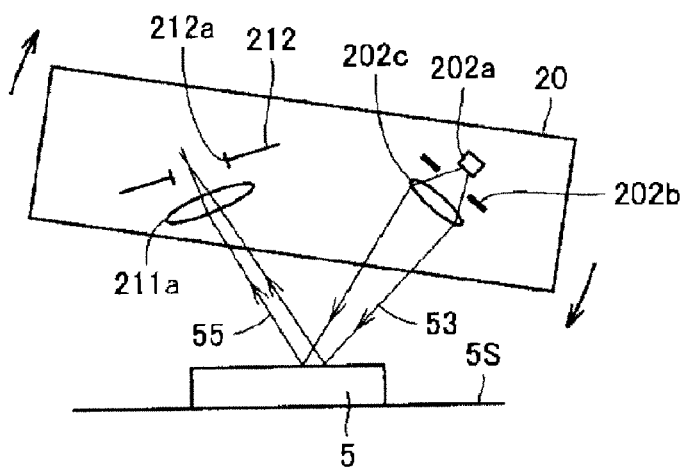
FIG. 22 is a view showing a state in which the sensor head body unit 20 is tilted in the left and right direction of the measuring target object 5 in the present embodiment.

According to the present embodiment, the converging position of the reflected light beam exists in the range of the light shielding portion on the light receiving center axis 56. Thus, the tolerable range of the incident angle of the reflected light beam 55 can be defined by using the size of the diameter of the opening 212a to the utmost extent. Therefore, the displacement of the surface of the measuring target object can be measured even when the measuring target object is inclined by a certain extent or when the inclination or the curvature of the surface of the measuring target object is large to a certain extent. This will be described with reference to FIG. 19 to FIG. 22. FIGS. 19, 21, and 22 show the component parallel to the incident plane of the light projection beam 53 and the reflected light beam 55. As described above, in the optical system according to the present embodiment, the light projection beam 53 is projected such that the component parallel to the "predetermined plane" containing the light receiving center axis 56 of the specular reflected light converges at the position in the direction of the light receiving center axis 56 where the light shielding portion 212 exists. Therefore, the effects described above can be obtained according to the present embodiment.

FIG. 19 is a schematic view showing the trajectory of the reflected light beam when the measuring target object 5 is inclined in the left and right direction of the measuring target object 5 in the present embodiment. FIG. 19 is a view compared with FIG. 15. As shown in FIG. 19, the reflected light beam 55 converges in the range of the light shielding portion 212 on the light receiving center axis (not illustrated) by the lens 211a in the present embodiment. Therefore, the beam width of the reflected light beam 55 becomes small at the opening 212a. Thus, the reflected light beam 55 can pass through the opening 212a of the light shielding portion 212 even if the inclination angle in the left and right direction of the measuring target object 5 becomes large.

The tilt of the measuring target object 5 in this case is the "tilt within the measurement target range defined in advance". This tilt is defined in advance by the optical measurement device based on specification and the like. The tilt is a tilt within a measurable (defined as measuring target by specification) angle range of the measuring target object. The "beam converging surface" in this case is defined as a plane parallel to the line direction on the surface of the measuring target object of the reflected light beam generated when the line beam from the light projecting portion is reflected at the surface of the plane measuring target object, and the light receiving center axis.

Figure 20:
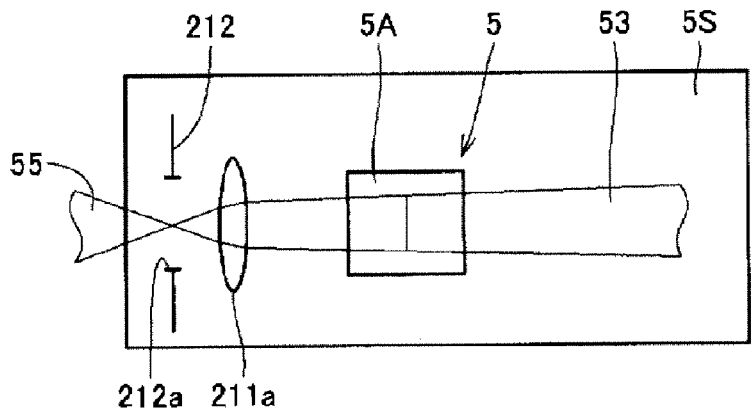
FIG. 20 is a schematic view showing the trajectory of the reflected light beam when the measuring target object 5 is inclined in the front and back direction of the measuring target object 5 in the present embodiment.

FIG. 20 is a schematic view showing the trajectory of the reflected light beam when the measuring target object 5 is inclined in the front and back direction of the measuring target object 5 in the present embodiment. FIG. 20 is compared with FIG. 16. As shown in FIG. 20, the reflected light beam 55 can pass through the opening 212a of the light shielding portion 212 even if the inclination angle in the front and back direction of the measuring target object 5 becomes large since the beam width of the reflected light beam 55 becomes small at the opening 212a. Furthermore, one part of the reflected light beam 55 can be avoided from being diffracted by the peripheral edge of the opening 212a.

FIG. 21 is a schematic view showing the trajectory of the reflected light beam when the surface of the measuring target object is inclined in the present embodiment. FIG. 21 is a view compared with FIG. 17. As shown in FIG. 21, the reflected light beam 55 generated when the light projection beam 53 is reflected at the inclined surface (or curved surface) converges in the range of the light shielding portion 212 on the light receiving center axis (not illustrated) by the lens 211a. Thus, even if the angle (or curvature) of the surface 5A of the measuring target object 5 becomes large to a certain extent, the reflected light beam 55 can pass through the opening 212a of the light shielding portion 212. The inclination of the surface of the measuring target object is the "tilt within the measurement target range defined in advance".

FIG. 22 is a view showing a state in which the sensor head body unit 20 is tilted in the left and right direction of the measuring target object 5 in the present embodiment. FIG. 22 is a view compared with FIG. 18. As shown in FIG. 22, the reflected light beam 55 can pass through the opening 212a of the light shielding portion 212 even if the sensor head body unit 20 is inclined to a certain extent as the reflected light beam 22 is converged by the lens 211a. The trouble required for adjusting the tilt of the sensor head body unit 20 thus can be reduced.

Figure 23:
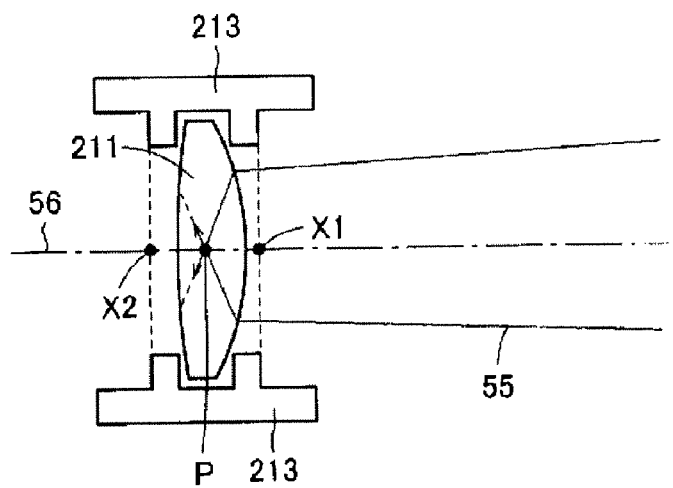
FIG. 23 is a view describing a focal position when the lens portion of the light receiving optical system is configured by a single lens.

In the configuration of the lens portion 211, the lens portion 211 is an assembled lens including a plurality of lenses. In this configuration, the converging position can be produced inside the lens portion 211 by converging the light projection beam that tends to be converged (beam width in the beam converging surface direction gradually is reduced), for example, with some of the plurality of lenses. As shown in FIG. 23, if the lens portion 211 is a signal lens, the light projection beam 53 is projected by the light projecting portion so that the converging position P of the reflected light beam 55 is inside the single lens. In this case, the range of the light shielding portion on the light receiving center axis 56 is the range from position X1 to position X2 shown in FIG. 23 since the lens holder 213 also has the function of the light shielding portion. Therefore, the converging position P exists within the range of the light shielding portion on the light receiving center axis 56.

In the above description, the method (specular reflection method) of receiving the specular reflected light from the surface of the measuring target object has been described, but the optical system according to the present embodiment can also be applied to the method (diffuse reflection method) of receiving the diffuse reflected light from the surface of the measuring target object.

As shown in FIG. 10A, in the present embodiment, the size (aperture) of the opening 212a of the light shielding portion 212 is defined so as to define the incident angle range of the diffuse reflected light 57 from the effective measurement range. The effective irradiation region corresponds to the effective measurement range defined in advance of the optical measurement device. Therefore, the measurement by the diffuse reflection method can be carried out by image-forming the diffuse reflected light from the relevant region at the imaging plane 203c.

The application range of the present invention is not limited to the displacement measurement of the distribution of the beam in the line direction at the surface of the measuring target object having the light irradiating the measuring target object as the line beam. For instance, the shape of the light to be applied may be an arbitrary shape including a circular beam and a rectangular beam, and application can be made to performing the displacement measurement by spots on the surface of the measuring target object.

The embodiments disclosed herein are illustrative in all aspects and should not be construed as being restrictive. The scope of the invention is defined by the Claims rather than by the description of the embodiments made above, and all modifications within the meaning and the scope equivalent to the Claims are intended to be encompassed.

What is claimed is:

1. An optical measurement device comprising:
    a light projecting portion configured to project an irradiation light towards a measuring target object existing in a measurement region,
    a light receiving portion configured to (i) receive a reflected light of both a diffuse reflected light and a specular reflected light generated when the irradiation light is reflected at a surface of the measuring target object from a direction in which a position of a reflected light image obtained according to a displacement of the surface of the measuring target object changes, and (ii) to acquire an image of the reflected light image; and
    a measurement processing portion configured to measure the displacement of the surface of the measuring target object that reflects the irradiation light based on the image acquired by the light receiving portion;
    wherein the light receiving portion includes:
        an imaging portion configured to acquire an image of an incident light as the image,
        an image-forming portion configured to cause the imaging portion to image-form the reflected light generated when the irradiation light projected from the light projecting portion is reflected at the surface of the measuring target object, and
        a light shielding portion configured to define an incident angle range of a component of the diffuse reflected light with respect to a center optical axis of the image-forming portion when the irradiation light is diffuse reflected at the measuring target object existing in the measurement region, the component being parallel to a predetermined plane including the center optical axis of the image-forming portion and reaching the image portion; and
    wherein the light projecting portion is configured to project the irradiation light to converge a component at a position in the direction of the center optical axis of the image-forming portion where the light shielding portion exists when the irradiation light is specular reflected at the measuring target object existing in the measurement region, the component being the specular reflected light and parallel to the predetermined plane.

2. The optical measurement device according to claim 1, wherein
    the light projecting portion is configured to apply a line beam towards the measuring target object existing in the measurement region as the irradiation light;
    the light receiving portion is configured to receive a reflected light of the line beam reflected at the surface of the measuring target object from a direction in which a distribution of the position of the reflected light image obtained in correspondence to the displacement of the surface of the measuring target object changes for a distribution of the beam in a line direction at the surface of the measuring target object; and
    the predetermined plane is a plane being perpendicular to an incident plane including a center optical axis of the line beam applied from the light projecting portion and a center optical axis of the image-forming portion, and including the center optical axis of the image-forming portion.

3. The optical measurement device according to claim 1, wherein
    the light projecting portion is configured to apply a line beam towards the measuring target object existing in the measurement region as the irradiation light;
    the light receiving portion is configured to receive a reflected light of the line beam reflected at the surface of the measuring target object from a direction in which a distribution of the position of the reflected light image obtained in correspondence to the displacement of the surface of the measuring target object changes for a distribution of the beam in a line direction at the surface of the measuring target object; and
    when the measuring target object, which is planar, is placed in the measurement region at an inclination within a measurement target range defined in advance, the predetermined plane is a plane parallel to the line direction at the surface of the measuring target object of the reflected light beam generated when the line beam from the light projecting portion is reflected at the surface of the measuring target object, and the center optical axis of the image-forming portion.

4. The optical measurement device according to claim 1, wherein the light shielding portion is formed with a circular opening having the center optical axis of the image-forming portion as a center, and shields the light on the outer side of the circular opening.

5. The optical measurement device according to claim 1, wherein
    the image-forming portion is configured by an assembled lens in which a plurality of lenses is combined; and
    the light shielding portion is arranged between the lenses positioned at both ends with respect to a lined direction of the plurality of lenses.

6. The optical measurement device according to claim 1, wherein
    the image-forming portion is a single lens; and
    a converging position in the direction of the center optical axis of the image-forming portion is inside the single lens for the component parallel to the predetermined plane of the specular reflected light of the irradiation light.

7. The optical measurement device according to claim 1, wherein the light shielding portion defines the incident angle range with respect to the center optical axis of the image-forming portion for the component parallel to the predetermined plane of the diffuse reflected light from an effective measurement range defined in advance at the surface of the measuring target object.

8. The optical measurement device according to claim 2, wherein the light projecting portion is configured to project the light beam such that a beam width in a direction parallel to the predetermined plane gradually becomes smaller as the line beam advances from the light projecting portion towards the light receiving portion; and the predetermined plane is a plane being perpendicular to an incident plane including a light projecting portion center optical axis of the line beam applied from the light projecting portion and an image-forming portion center optical axis serving as a center optical axis of the image-forming portion, and including the image-forming portion center optical axis.

* * * * *